(12) United States Patent
Yoshimura et al.

(10) Patent No.: US 6,664,954 B1
(45) Date of Patent: Dec. 16, 2003

(54) COORDINATE INPUT INDICATOR

(75) Inventors: Yuichiro Yoshimura, Kamakura (JP); Masahide Hasegawa, Yokohama (JP); Kiwamu Kobayashi, Yokohama (JP); Masaaki Kanashiki, Yokohama (JP); Atsushi Tanaka, Yamato (JP); Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,069

(22) Filed: Nov. 3, 1999

(30) Foreign Application Priority Data

Nov. 5, 1998 (JP) .......................................... 10-314128
Dec. 3, 1998 (JP) .......................................... 10-343678
Jun. 3, 1999 (JP) .......................................... 11-156635

(51) Int. Cl.[7] .......................... G09G 5/00; G03B 21/00; F21K 27/00
(52) U.S. Cl. .......................... 345/179; 353/42; 362/259
(58) Field of Search .................. 362/118, 109, 362/205, 206, 257, 259; 356/141.5, 622; 353/42; 345/156, 157, 158, 173, 175, 179, 180, 181, 182; 178/18.01, 18.09, 18.11, 19.01, 19.04, 19.05; 340/815.45

(56) References Cited

U.S. PATENT DOCUMENTS

| 4,150,285 | A | * | 4/1979 | Brienza et al. .............. 356/622 |
| 5,115,230 | A | | 5/1992 | Smoot .......................... 340/707 |
| 5,341,155 | A | | 8/1994 | Elrod et al. .................. 345/179 |
| 5,450,148 | A | * | 9/1995 | Shu et al. ...................... 353/42 |
| 5,495,269 | A | * | 2/1996 | Elrod et al. ................... 345/179 |
| 5,570,299 | A | | 10/1996 | Tokioka et al. |
| 5,570,302 | A | | 10/1996 | Kobayashi et al. |
| 5,764,224 | A | * | 6/1998 | Lilja et al. .................... 345/179 |
| 5,938,308 | A | * | 8/1999 | Feldman et al. ............... 353/42 |
| 5,938,315 | A | * | 8/1999 | Chao ........................... 362/259 |
| 5,949,402 | A | * | 9/1999 | Garwin et al. ............... 345/156 |
| 5,959,617 | A | * | 9/1999 | Bird et al. ................... 345/182 |
| 6,100,538 | A | * | 8/2000 | Ogawa ........................ 345/173 |

FOREIGN PATENT DOCUMENTS

| JP | 6-274266 | 9/1994 |
| JP | 7-76902 | 8/1995 |
| JP | 2503182 | 3/1996 |

* cited by examiner

*Primary Examiner*—Chanh Nguyen
*Assistant Examiner*—Paul A. Bell
(74) *Attorney, Agent, or Firm*—Fitzpatrick, Cella, Harper & Scinto

(57) ABSTRACT

A cap covering a light-emitting element attached to the distal end of an indicator is held by a sliding member, and is slidably attached axially along the indicator. By pressing/separating the cap against/from a coordinate input surface, a tact switch operates interlockingly with the cap to switch driving control of the light-emitting element. For example, the light-emitting element is driven by pressing the cap, and driving of the light-emitting element is stopped by separating the cap. Since the cap covers the light-emitting element, the light-emitting element can be prevented from being worn and scratched. Driving control of the light-emitting element need not be additionally switched, resulting in high operability.

13 Claims, 27 Drawing Sheets

FIG. 3

| SWITCH A | SWITCH B | SWITCH C | SWITCH D | EMISSION | PEN-DOWN | PEN BUTTON |
|---|---|---|---|---|---|---|
| X | X | — | — | OFF | OFF | OFF |
| O | X | X | X | ON | OFF | OFF |
| O | X | O | X | ON | ON | OFF |
| O | X | X | O | ON | OFF | ON |
| O | X | O | O | ON | ON | ON |
| O | O | — | — | ON | ON | ON |
| X | O | — | — | ON | ON | OFF |

46 CAP
463 SLIPPING MEMBER

46 CAP
463 SLIPPING MEMBER

F I G. 10
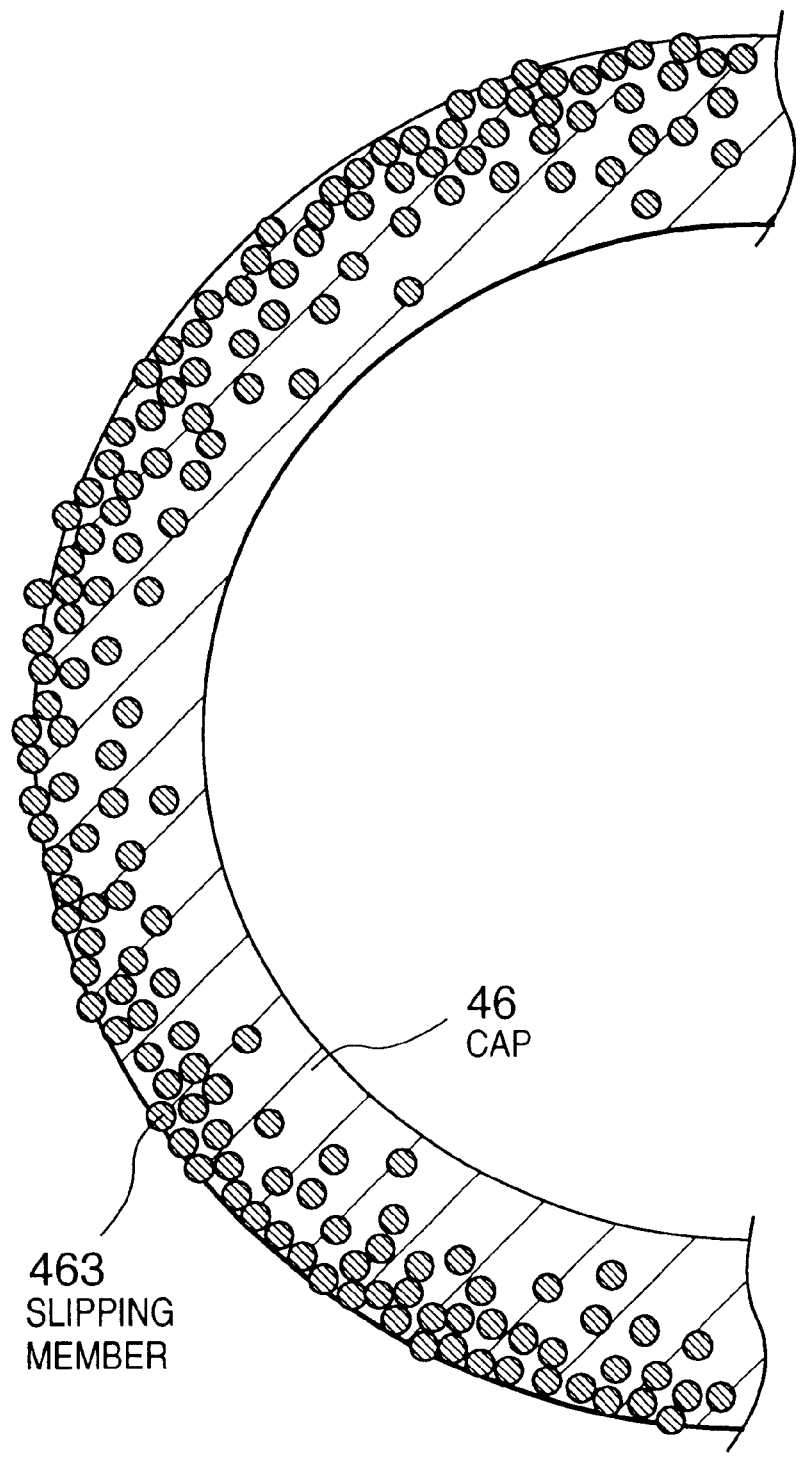

464b  463b  41  47b

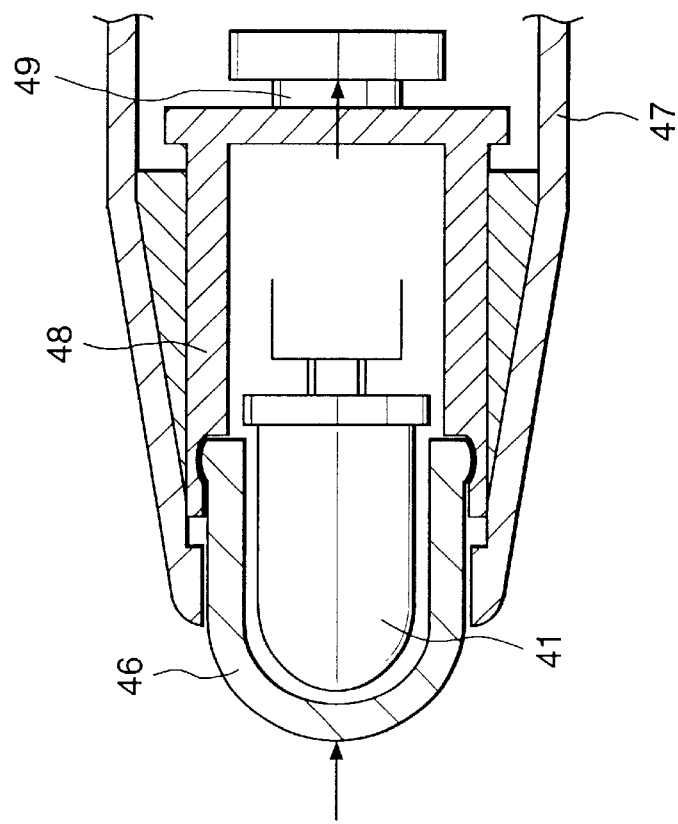
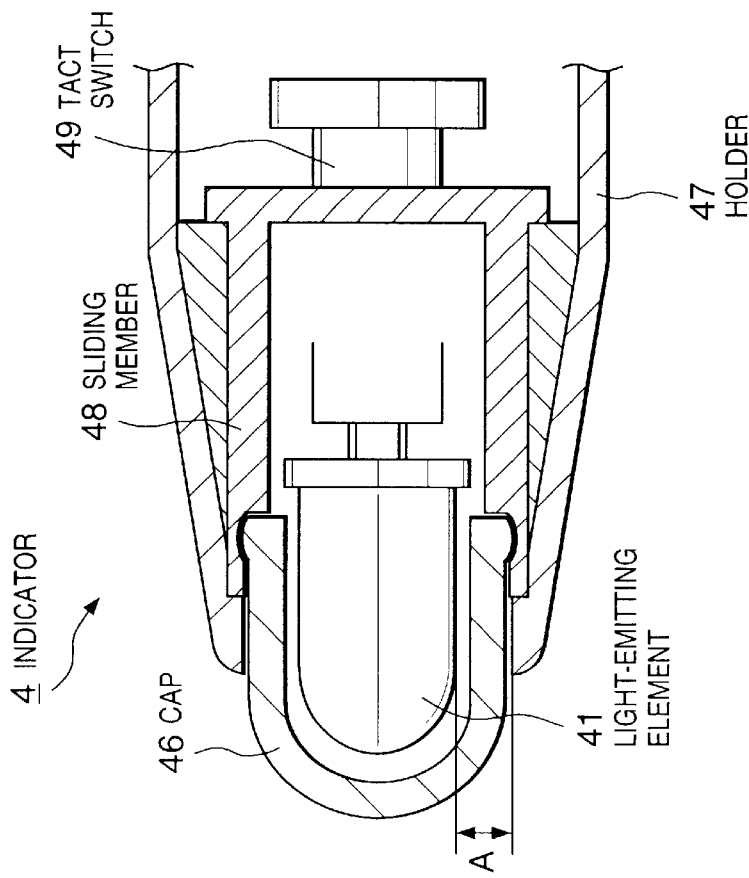
FIG. 24A
FIG. 24B

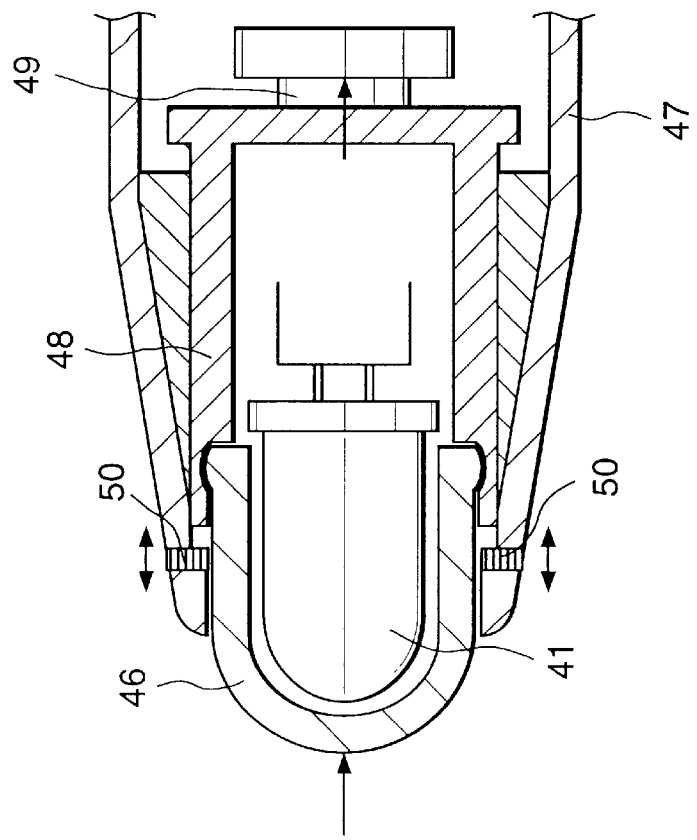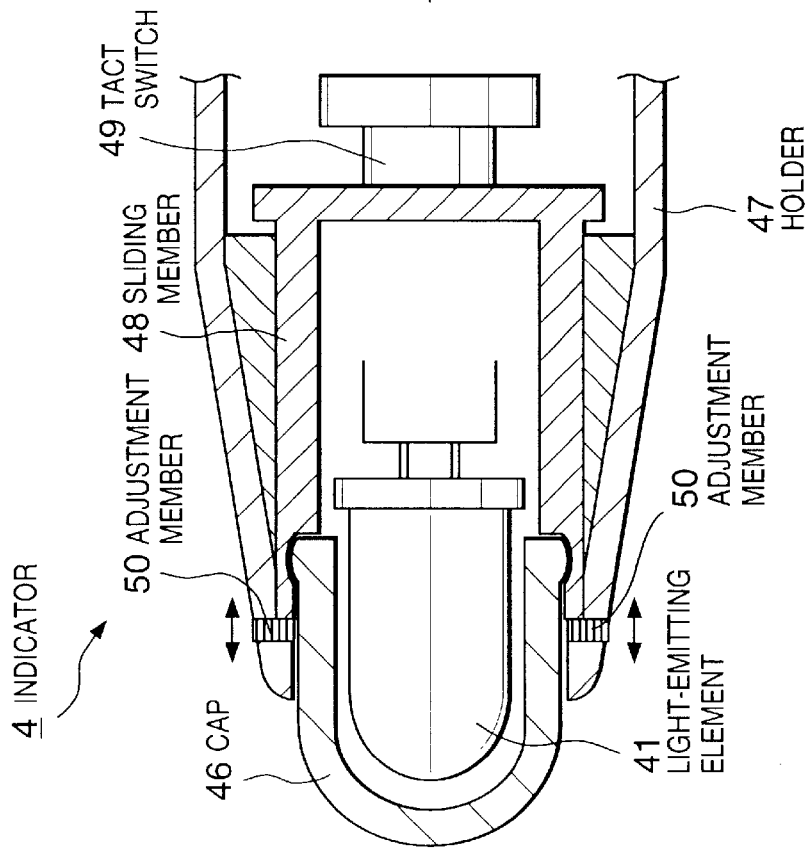
FIG. 25A
FIG. 25B

COORDINATE INPUT INDICATOR

BACKGROUND OF THE INVENTION

1. Field of the Invention

The present invention relates to a coordinate input indicator for indicating an arbitrary position on the coordinate input surface of a coordinate input apparatus and inputting the coordinates of the indicated position and, more particularly, to a coordinate input indicator for an optical coordinate input apparatus for inputting coordinates by detecting the coordinates of the irradiated position of a light spot irradiating the coordinate input surface, which indicator is used to indicate an arbitrary position on the coordinate input surface, irradiate the surface with a light spot, and input coordinates.

2. Description of the Related Art

An optical coordinate input apparatus is used in, e.g., a large-display system capable of inputting coordinates. In this case, an arbitrary position on a display screen serving as the coordinate input surface of the large display is indicated by a coordinate input indicator (to be referred to as an indicator) having a light-emitting element, and irradiated with a light spot emitted by the light-emitting element. The coordinates of the irradiated position are input to control an externally connected computer or handwrite characters, figures, and the like.

Known examples of this optical coordinate input apparatus are one for sensing a light spot on the coordinate input surface using a CCD area sensor or linear sensor, and calculating and outputting the coordinate values of the light spot position by image processing using barycentric coordinates or pattern matching, and one using a position detection element (analog device capable of obtaining an output voltage corresponding to a light spot position) called a PSD.

For example, Japanese Patent Publication No. 7-76902 discloses an apparatus for sensing a light spot of a parallel beam of visible light with a video camera to detect the coordinates of the light spot irradiated position, and at the same time transmitting/receiving control signals by infrared diffused light. Japanese Patent Laid-Open No. 6-274266 discloses an apparatus for detecting coordinates using a linear CCD sensor and special optical mask. U.S. Pat. No. 2,503,182 discloses the arrangement and output coordinate correction method of an apparatus using a PSD.

However, no references particularly prescribe the structure around the light-emitting element, e.g., LED or semiconductor laser of a light-emitting portion for emitting a light spot in the indicators of these conventional optical coordinate input apparatuses. The light-emitting element is exposed at the distal end of the indicator, and light from the light-emitting element directly irradiates the coordinate input surface without the mediacy of any member. When characters, figures, and the like are handwritten using the indicator as a so-called input pen, the light-emitting element is directly brought into contact with the coordinate input surface to input coordinates.

When the indicator is brought as an input pen into contact with the coordinate input surface to input coordinates, the transparent sealing resin of the light-emitting element, e.g., LED wears owing to friction against the coordinate input surface. The shape of the sealing resin serving as a lens changes to decrease the light irradiation amount from the LED or change the light distribution, resulting in low coordinate detection precision.

The light-emitting element such as an LED is an industrial general-purpose member. To improve the transparent sealing resin of the light-emitting element itself in order to reduce wear, the material must be improved in consideration of corrosion resistance against a light-emitting chip. Such light-emitting element requires a higher cost than a general-purpose member.

A light-emitting portion equipped with a filter has conventionally been proposed. However, the filter itself is an optical component which inhibits wear and scratches, and is part of a light-emitting element serving as a light-emitting member. No arrangement against wear and scratches is disclosed.

If the light-emitting element or filter greatly wears, the light-emitting element or filter must be exchanged, or the whole indicator must be exchanged.

If the wearing or scratched light-emitting element or filter is repetitively brought into contact with the coordinate input surface, it also scratches the coordinate input surface.

On the other hand, the indicator is often used as a large-size input device in combination with a large-size display device or singly for the purpose of presentation. The indicator is used in different modes, i.e., when the indicator is directly brought into contact with an input screen to indicate an arbitrary position as an input pen, and when the indicator remote-indicates an arbitrary position as a pointer. The indicator must change its light irradiation state so as to form optimal light spots in the respective modes.

SUMMARY OF THE INVENTION

The present invention has been made to overcome the conventional drawbacks, and has as its object to provide a coordinate input indicator which is used in an optical coordinate input apparatus, prevent a light-emitting element for emitting light to form a light spot from wearing and scratching, and attain high operability.

It is another object of the present invention to provide a coordinate input indicator capable of maintaining a stable emission state for a long time and inputting coordinates at high resolution and high precision.

To achieve the above objects, according to the present invention, there is provided a coordinate input indicator which forms a light spot on a coordinate input surface of an optical coordinate input apparatus to input coordinates, and has at a distal end a light-emitting element for forming a light spot, comprising:

a cap which is made of a transparent material and covers the light-emitting element at the distal end of the indicator, wherein the cap contacts the coordinate input surface when the distal end of the indicator is brought into contact with the coordinate input surface to input coordinates.

In this arrangement, when the distal end of the indicator is brought into contact with the coordinate input surface to input coordinates, the cap contacts the coordinate input surface, but the light-emitting element does not contact the coordinate input surface. The light-emitting element can be prevented from being worn and scratched by the contact.

According to the present invention, the cap is spaced apart from the light-emitting element.

In this arrangement, when the distal end of the indicator is brought into contact with the coordinate input surface to input coordinates, no external force is applied to the light-emitting element. The light-emitting element can be prevented from being damaged by the external force.

According to the present invention, the cap is attached to a main body of the coordinate input indicator via an elastic cushioning member, and the cap is attached to the light-emitting element via a transparent elastic cushioning member.

These arrangements can lessen shocks applied to the cap upon pressing the cap against the coordinate input surface to input coordinates.

According to the present invention, the transparent material forming the cap reduces a coefficient of friction on a surface of the cap, grained slipping members mainly containing a lubricant for reducing the coefficient of friction of the cap are interspersed on at least a surface of the cap, and linear slipping members mainly containing a lubricant for reducing the coefficient of friction of the cap are formed on a surface of the cap.

These arrangements can reduce the coefficient of friction on the cap surface. Particularly when characters, line drawings, and the like are input by moving the cap in contact with the coordinate input surface, the cap slips well. The cap and coordinate input surface can be prevented from being worn and scratched, and the operability of the indicator is improved.

To achieve the above objects, a coordinate input indicator according to the present invention comprises the following arrangement.

That is, a coordinate input indicator for irradiating a predetermined position on a coordinate input screen with light to form a light spot, and inputting coordinates corresponding to the light spot, comprises:

light-emitting means, incorporated in the indicator, for emitting light; and a transparent member which covers the light-emitting means and is detachable from the indicator.

The transparent member is preferably made of at least one transparent resin material selected from the group consisting of PMMA (polymethyl methacrylate), AS (styrene-acrylonitrile copolymer), PS (polystyrene), PC (polycarbonate), and epoxy resin.

The transparent member preferably has an almost hemispherical dome-like shape with a predetermined thickness.

The transparent member preferably has a concave lens for diffusing light toward the coordinate input screen.

The transparent member preferably has a convex lens characteristic for condensing light on the coordinate input screen.

It is preferable that the transparent member comprise a first transparent member having a concave lens for diffusing light toward the coordinate input screen, and a second transparent member having a convex lens characteristic for condensing light on the coordinate input screen, the first transparent member having an almost hemispherical dome-like shape, the second transparent member having a cylindrical shape, and the second transparent member be attached to the first transparent member attached to the light-emitting means.

It is preferable that the transparent member comprise at least a first transparent member having a concave lens for diffusing light toward the coordinate input screen, and a second transparent member having a convex lens characteristic for condensing light on the coordinate input screen, and the first and second transparent members constitute zoom lens mechanism.

The transparent member preferably comprises a plurality of exchangeable transparent members having different optical irradiation characteristics.

To achieve the above objects, according to the resent invention, there is provided a coordinate input indicator of an optical coordinate input apparatus, comprising:

a light-emitting element (e.g., an LED or semiconductor laser) which is attached to a distal end of the coordinate input indicator to emit light in order to form a light spot;

a cap which is made of a transparent material (e.g., a transparent resin material), covers the light-emitting element, and is movably attached;

control means for controlling driving of the light-emitting element; and switching means (tact switch) which operates interlockingly with the cap and switches driving control of the light-emitting element by the control means, wherein the cap is pressed/separated against/from the coordinate input surface to operate the switching means, and driving control of the light-emitting element by the control means is switched.

In this arrangement, the light-emitting element is covered with the cap. When the coordinate input indicator is brought into contact with the coordinate input surface to input coordinates, the light-emitting element can be prevented from being worn and scratched by friction against the coordinate input surface.

Driving control of the light-emitting element is switched by pressing/separating the cap against/from the coordinate input surface. For example, the light-emitting element is driven by pressing the cap against the coordinate input surface, and driving of the light-emitting element is stopped by separating the cap from the coordinate input surface. Driving control of the light-emitting element need not be additionally switched, resulting in high operability.

The cap is movably spaced apart from the light-emitting element so as not to apply an external force to the light-emitting element upon pressing the cap against the coordinate input surface.

The indicator preferably further comprises means for adjusting an operating stroke or operating pressure by which the switching means operates interlockingly with the cap.

It is preferable that the cap be detachable from a main body of the coordinate input indicator, and the switching means not be operated when the cap is removed from the main body.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing an operation mode corresponding to the operation states of four operation switches of the coordinate input indicator according to the first embodiment of the present invention;

FIG. 10 is a sectional view showing the structure of the distal end of still another modification of the coordinate input indicator according to the first embodiment of the present invention;

FIGS. 24A and 24B are sectional views, respectively, showing the structure of the distal end of a coordinate input indicator according to the third embodiment of the present invention;

FIGS. 25A and 25B are sectional views, respectively, showing the structure of the distal end of a modification of the coordinate input indicator according to the third embodiment of the present invention.

DETAILED DESCRIPTION OF THE PREFERRED EMBODIMENTS

Preferred embodiments of the present invention will be explained below with reference to the accompanying drawings. Embodiments of the indicator of an optical coordinate input apparatus used in a large-display system capable of inputting coordinates will be described.

First Embodiment
<Description of Schematic Arrangement of Large-Display System Including Coordinate Input Apparatus>

The schematic arrangement of a large-size display system including a coordinate input apparatus using an indicator according to the first embodiment will be described with reference to FIG. 1.

Figure 1:
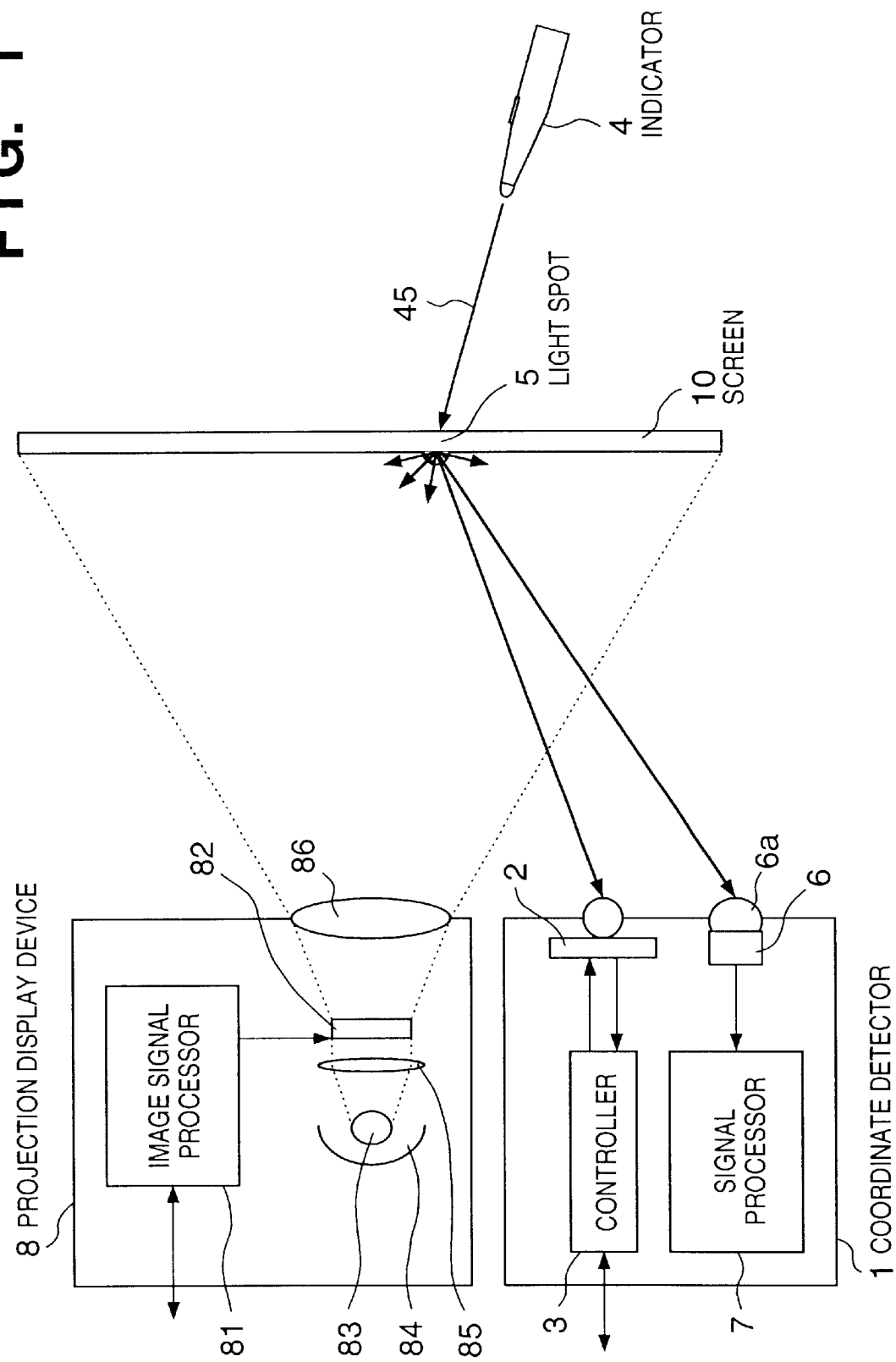
FIG. 1 is a schematic view showing the entire arrangement of a large-display system including a coordinate input apparatus using a coordinate input indicator according to the first embodiment of the present invention.

The coordinate input apparatus included in the display system shown in FIG. 1 is roughly constituted by a screen 10 serving as a coordinate input surface and display screen, indicator 4 for emitting a light beam 45 to the screen 10 to form a light spot 5, and coordinate detector 1 for detecting the coordinates of the irradiated position of the light spot 5 on the screen 10. In addition to them, the display system comprises as an output device a projection display device 8 for displaying an image or coordinate information on the screen 10.

The indicator 4 functions as a so-called input pen, and is formed into a pen as a whole. The indicator 4 will be described in detail later.

The coordinate detector 1 comprises a coordinate sensor 2, controller 3 for controlling the sensor 2 and calculating coordinates, control signal sensor (light-receiving element) 6, and signal processor 7. The coordinate detector 1 detects the coordinates of the irradiated position of the light spot 5 on the screen 10 and a control signal corresponding to each operation switch state (to be described later) of the indicator 4, and transmits information about the detected coordinates and control signal to an externally connected device (not shown) such as a computer via the controller 3.

The projection display device 8 comprises an image signal processor 81 for receiving an image signal from a display signal source as an externally connected device such as a computer (not shown), liquid crystal panel 82 controlled by the image signal processor 81 to form an image corresponding to the image signal, an optical illumination system made up of a lamp 83 for illuminating the liquid crystal panel, mirror 84 for reflecting the illumination light, and condenser lens 85 for condensing illumination light directly from the lamp 83 and light reflected by the mirror 84, and projection lens 86 for projecting the image on the illuminated liquid crystal panel 82 onto the screen 10. The projection display device 8 can display a desired image on the screen 10.

The screen 10 has a proper light diffusion property in order to widen the observation range of a projected image. The light beam 45 emitted by the indicator 4 is diffused at the position of the light spot 5, and part of the light diffused at the position of the light spot 5 is incident on the coordinate detector 1 regardless of the position on the screen 10 and the direction of the light beam 45.

With this arrangement, the indicator 4 indicates a desired position on the screen 10, and forms the light spot 5 to input its coordinates. While moving the irradiated position, the indicator 4 successively inputs the coordinates of the moving locus to input character information or line drawing information. The projection display device 8 displays the information on the screen 10. In this manner, information can be input/output like "paper and pencil". If a button or icon is displayed on the screen 10, and irradiated with the light spot 5 to input its coordinates and a control signal (to be described later), button operation and input operation such as icon selection/determination can be freely performed.

<Detailed Description of Indicator 4>

The indicator 4 will be described in detail with reference to FIGS. 2 and 3.

Figure 2:
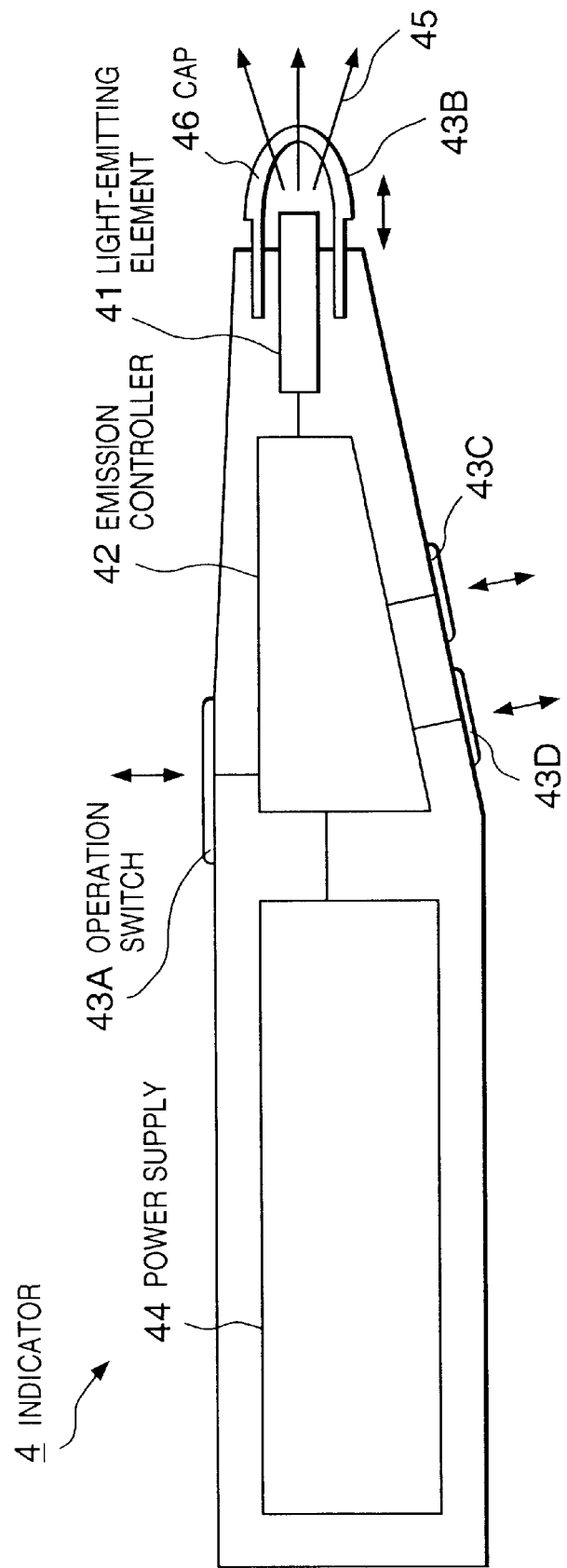
FIG. 2 is a schematic view showing the structure of the coordinate input indicator according to the first embodiment of the present invention.

FIG. 2 is a schematic view showing the arrangement of the indicator 4. As shown in FIG. 2, the indicator 4 comprises a light-emitting element 41 formed from a semiconductor laser or LED for emitting a light beam in order to form a light spot, emission controller 42 for controlling to drive the light-emitting element 41 (emission), power supply 44, and four operation switches 43A to 43D. A cap 46 for covering the light-emitting element 41 is attached to the distal end of the indicator 4. The cap 46 will be described in detail later.

The emission controller 42 performs emission control of superposing a control signal by emission ON/OFF operation and a modulation method (to be described later) in accordance with the operation states of the four operation switches 43A to 43D.

FIG. 3 is a table showing the operation mode of the indicator 4 (driving mode of the light-emitting element 41) under the control of the emission controller 42 in accordance with the operation states of the operation switches 43A to 43D. In FIG. 3, switches A to D respectively correspond to the operation switches 43A to 43D. "Emission" in FIG. 3 represents an emission signal (coordinate signal for inputting coordinates) for causing the light-emitting element 41 to emit light. "Pen-down" and "pen button" represent control signals corresponding to pen-down operation for inputting characters or line drawings and selecting a button, and pen button operation for calling a menu. "○" represents the pressed (operation) state of each switch, and "X" represents the released state (unpressed state).

An operator grips the indicator 4 to direct its distal end toward the screen 10. The switch 43A is attached to a position where the thumb naturally touches it, and the operator presses the switch 43A to emit the light beam 45.

Then, the light spot 5 is formed on the screen 10, and the coordinates of the irradiated position are detected by processing (to be described later)to start outputting coordinate signals. In this state, pen-down and pen button control signals are OFF. For this reason, only the indicated position is represented to the operator by movement of the cursor or highlight switching corresponding to the movement of the light spot 5 on the screen 10.

When the operator presses the switches 43C and 43D attached to positions where the index and middle fingers naturally touch them, pen-down and pen button control signals are output as signals superposed on emission signals, as shown in the table of FIG. 3. More specifically, the operator presses the switch 43C to set a pen-down state, and can execute screen control to start inputting characters and line drawings or to select and determine buttons. The operator presses the switch 43D to set a pen button state to input an optional function such as menu calling. This allows the operator to easily perform operation, for example, to quickly, accurately write characters and figures or select buttons and menus at arbitrary positions on the screen 10 with one hand.

The switch 43B includes the cap 46 as an operation member, and is attached to the distal end of the indicator 4. This switch 43B is turned on by pressing the indicator 4, i.e., cap 46 against the screen 10. While the operator grips the indicator 4 but does not press the switch 43A, the operator presses the distal end of the indicator 4 against the screen 10. Then, the switch 43B is pressed to output an emission signal, and the light-emitting element 41 emits light. At the same time, a pen-down signal is output in response to modulation of the emission signal to set a pen-down state. If the operator presses the switch 43A in this state, a pen button signal is output. In this state, the switch 43A serves as a pen button. If the operator releases the switch 43A, and separates the distal end of the indicator 4 from the screen 10, the switch 43B is turned off to disable the emission signal, the light-emitting element 41 stops emitting light, and the output of the pen-down or pen button control signal stops. The function of the switch 43B has been described, and its detailed mechanical structure will be described later.

Note that even if the operator does not press the distal end of the indicator 4 against the screen 10, he/she can only press the switch 43A to emit light from the light-emitting element 41 and form the light spot 5, and can move the light spot 5 to move the cursor. In practice, however, the operator can more accurately input characters and figures with higher operability by bringing the distal end of the indicator 4 into contact with the input surface, compared to the case of inputting characters and figures in a space apart from the input surface.

The first embodiment realizes natural, comfortable operation using the four switches 43A to 43D even when the operator is apart from or near the input surface of the screen 10. The operator can selectively use the indicator 4 as the case may be. If the indicator 4 is dedicated for direct input (not used as a pointer for indicating a position while the operator is apart from the input surface), the light-emitting element 41 need not emit parallel light beams, and can be a diffused light source. Thus, an LED lower in cost and longer in service life than a semiconductor laser can be used. When the distal end of the indicator 4 is directly brought into contact with the screen 10, problems such as wear arising from the friction between the distal end of the indicator 4 and the screen must be considered. To prevent this, the first embodiment adopts the cap 46.

Further, two, remote and proximity indicators 4 using an LED and semiconductor laser for light-emitting elements 41 may be employed. A plurality of operators may simultaneously operate a plurality of indicators 4. Alternatively, a plurality of indicators 4 different in attributes such as input line color and thickness may be used. In these cases, the emission controller 42 transmits an ID number unique to each indicator 4 together with a control signal. Attributes such as line thickness and color displayed on the screen 10 are determined by software or the like on an externally connected device side in correspondence with the transmitted ID number. Settings of these attributes may be changed by buttons and menus on the screen 10. This operation may also be achieved by attaching another operation button or the like to the indicator 4 and operating this button to transmit a change designation signal. As for settings of the operation buttons and the like, the state may be held in the indicator 4 or coordinate detector 1, and attribute information may be transmitted to the externally connected device instead of the ID number.

This additional operation button can be set to realize another function, e.g., to flash a display device, switch a signal source, or operate a picture recording device. Further, a pressure detection means may be added to either or both of the switches 43A and 43B to detect the writing pressure, and the writing pressure data may be transmitted together with a control signal. In this way, various useful signals can be transmitted.

Signals output in accordance with the operation of the switches 43A to 43D will be explained in detail.

As described above, when the switch 43A or 43B of the indicator 4 is pressed, an emission signal is output to start emitting light. The emission signal is output as follows. A leader portion made of a relatively long, continuous optical pulse sequence having a predetermined frequency, and a subsequent header portion made of codes (e.g., a manufacturer ID) of a plurality of bits forming a short optical pulse sequence are output. Then, transmission data sequences made of a pen ID, pen-down and pen button control signals, and the like are sequentially transmitted in a predetermined order and format (see an signal LSG in FIG. 12).

In the first embodiment, bit "1" forms a signal according to a data encoding method using an interval twice that of bit "0" in each data bit. The data encoding method is not particularly limited. The average emission light quantity of the light-emitting element 41 is desirably constant to detect coordinates, and the clock component is desirably large to establish PLL locking, to be described below. The redundancy can be set relatively high with respect to the transmission data amount. Considering them, in the first embodiment, 6-bit (64) data are assigned to 108 codes using "1"s and "0"s equal in number and a "1" or "0" having a run length of 3 or less. According to this encoding method, the average power is made constant, a sufficient clock component is included, and thus a stable sync signal can be easily generated in decoding.

Although each of pen-down and pen button control signals is made of 2 bits, another long data such as an ID must be transmitted. In the first embodiment, 24 bits construct one block. The first 2 bits represent a control signal; next 2 bits, a content identification code (e.g., "00" for a writing pressure signal or "11" for an ID); and next 2 bits, parities. Subsequent to these bits, 16-bit data and a 2-bit parity are arranged.

This data is encoded into a 40-bit signal by the above method. A 10-bit sync code is added to the head of the 40-bit signal. This sync code uses a special code having 4 successive "0"s and 5 successive "1"s or an inverted pattern (switched depending on whether the end of a preceding block is "1" or "0"). This facilitates identification of the sync code from a data word. Even in the middle of a data sequence, the position of the sync code can be reliably identified to decode data. Hence, a transmission signal having one 50-bit block is attained, and a control signal and 16-bit ID or writing pressure data are transmitted.

In the first embodiment, the second frequency is set to 7.5 kHz which is ⅛ the first frequency of 60 kHz corresponding to the cycle of the pulse sequence. This cycle is used as the cycle of bits "0" in the above-described encoding method. The average transmission bit rate results in 5 kHz which is ⅔ the second frequency. Since one block is made of 50 bits, data of one 24-bit block is transmitted at 100 Hz. Therefore, the effective bit rate except for parities is 2,000 bits/sec. In this way, the redundancy is high, but synchronization can be easily established with a very simple arrangement while preventing erroneous detection. By using both a phase locking signal for sensor control (to be described below) and a check for the repetitive cycle of the sync code, the signal can be followed even when a short dropout occurs. Such a dropout can be reliably identified by the presence/absence of a header signal from quick operation such as pen-up or double tap operation.

<Detail Description of Cap>

The cap 46 will be described in detail.

Figure 4:
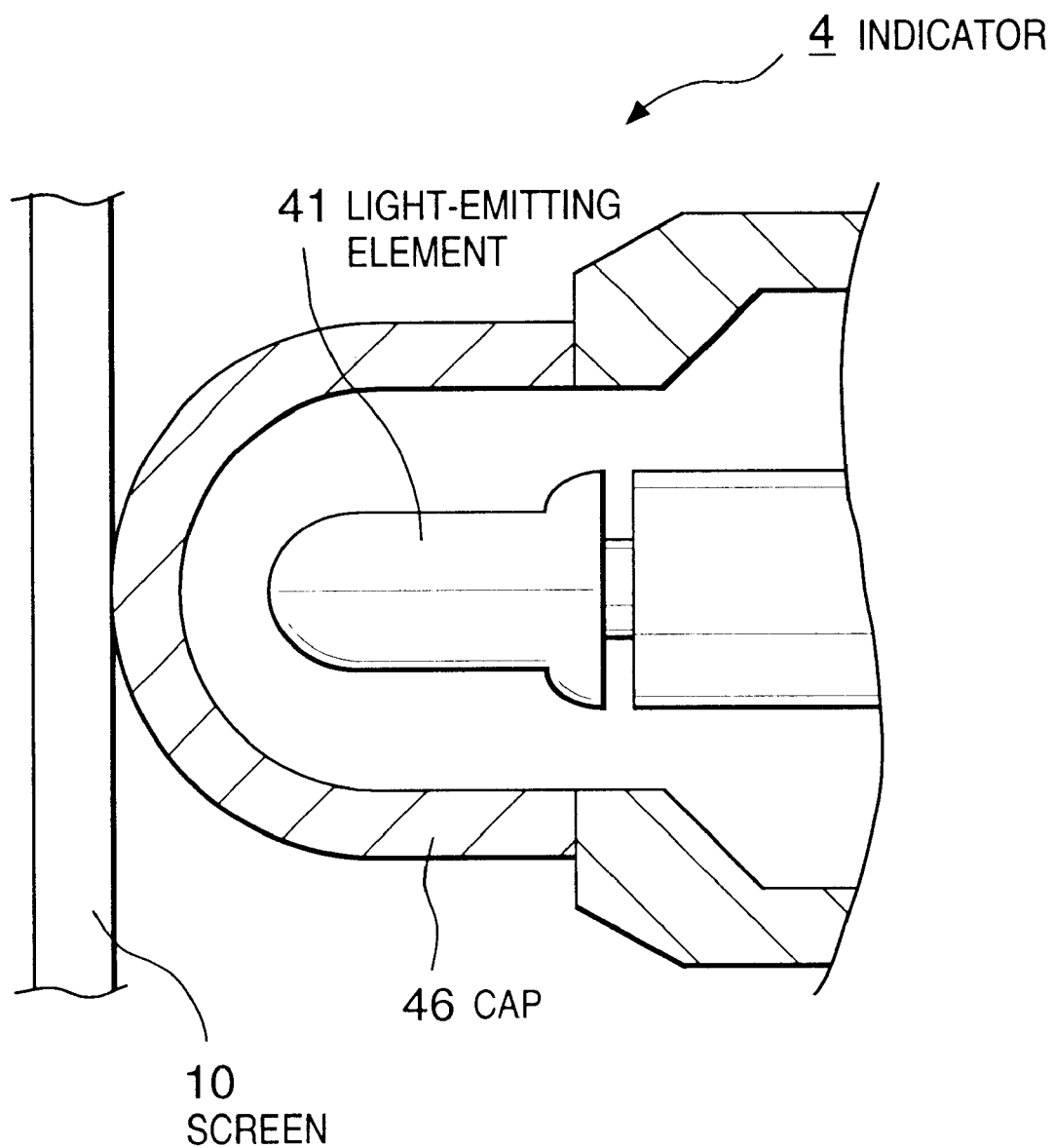
FIG. 4 is a sectional view showing the structure of the distal end of the coordinate input indicator according to the first embodiment of the present invention.

In the indicator 4 of the first embodiment, as shown in FIG. 4, the cap 46 made of a transparent material is attached to the distal end of the indicator 4 so as to cover the light-emitting element 41. In FIG. 2, the cap 46 serves as the operation member of the operation switch 43B. However, the cap 46 need not always be an operation member constituting a switch as far as the cap 46 covers the light-emitting element 41. In FIG. 4, the cap 46 is not an operation member constituting a switch, but is fixed to the distal end of the main body of the indicator 4 as a cap covering the light-emitting element 41 (in this case, the pen-down function and the like are given to a switch attached to another portion of the indicator 4).

The cap 46 contacts the screen when coordinates are input in a mode in which the distal end of the indicator 4 is directly brought into contact with the screen 10. This structure prevents the light-emitting element 41 such as an LED from directly contacting the screen. Since the cap 46 is attached to the main body of the indicator 4 with a space apart from the light-emitting element 41, an external force generated by directly pressing the cap 46 against the screen 10 is not applied to the light-emitting element 41.

Hence, the light-emitting element 41 does not influence its emission state owing to wear or scratches generated by friction against the screen, and is not damaged by any external force.

The cap 46 must be made of a transparent material for transmitting light in order to transmit light from the light-emitting element 41 without attenuation and project the light on the screen 10. The cap 46 is made of a transparent resin material such as PMMA (polymethyl methacrylate), AS (styrene-acrylonitrile copolymer), PS (polystyrene), PC (polycarbonate), or epoxy resin. The cap 46 may be formed from another material, and may be colored so long as the material is transparent.

The cap 46 is attached to the distal end of the indicator 4 within a range where the cap 46 contacts the screen 10. As shown in FIG. 4, the cap 46 has an almost hemispherical dome-like shape with a predetermined thickness so as to cope with operation of inputting coordinates with the inclined indicator 4.

Figure 5:
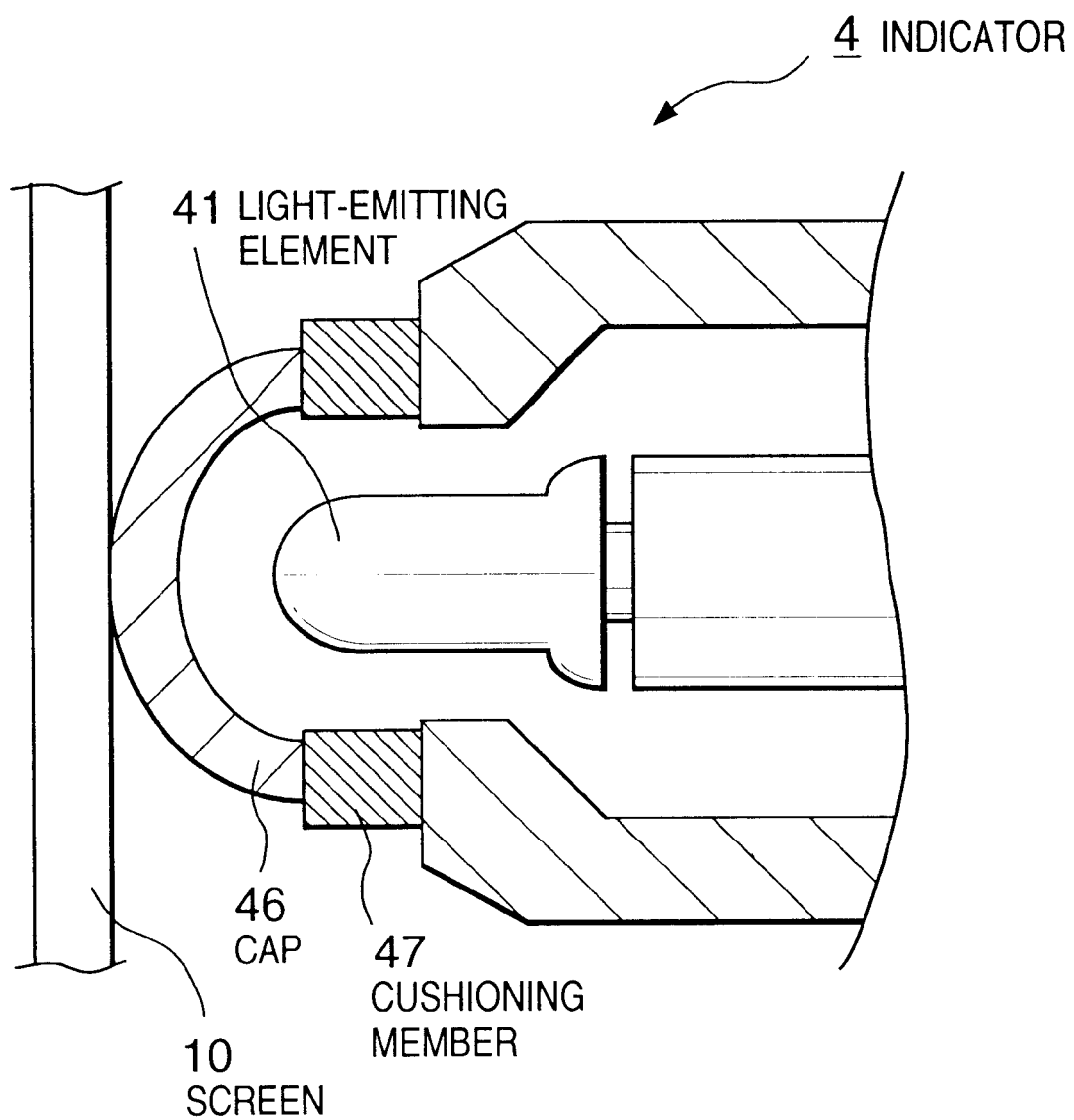
FIG. 5 is a sectional view showing the structure of the distal end of a modification of the coordinate input indicator according to the first embodiment of the present invention.

Since the cap 46 suffices to exist in the minimum range so far as it contacts the screen 10, the cap 46 may be formed within a smaller range as shown in FIG. 5 than in FIG. 4. As shown in FIG. 5, the cap 46 may be attached to the distal end of the main body of the indicator 4 via a cushioning member 47 made of an elastic member such as rubber in order to lessen shocks during pressing the cap 46 at the distal end of the indicator 4 against the screen 10.

In the structure of FIG. 5, the cushioning member 47 is also spaced apart from the light-emitting element 41, similar to the cap 46, so as to prevent any external force from being applied to the light-emitting element 41 when coordinates are input by pressing the cap 46 against the screen 10.

Although not shown, when the light-emitting element 41 is equipped with a filter member, the cap 46 further covers this filter member.

Figure 6:
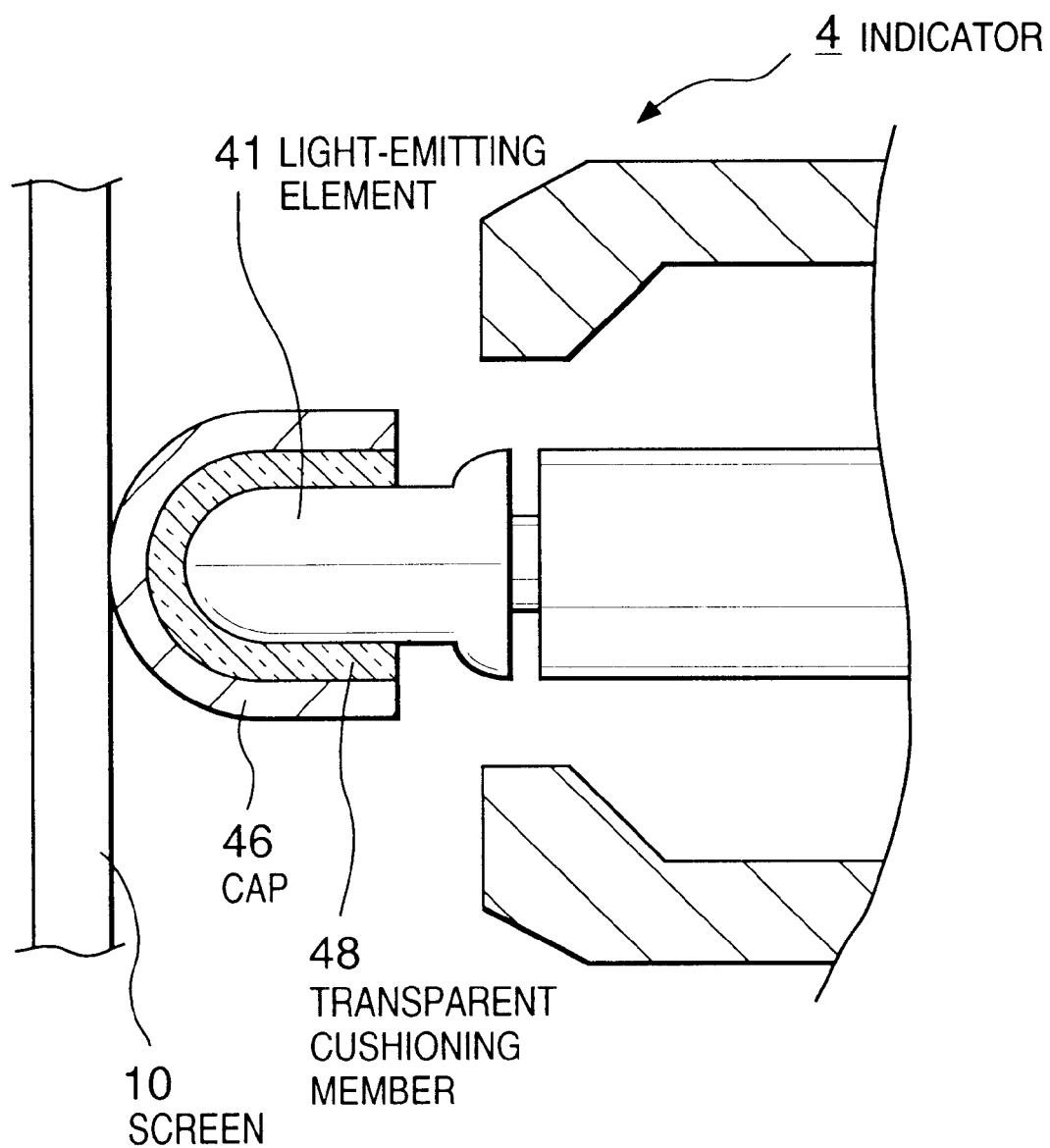
FIG. 6 is a sectional view showing the structure of the distal end of another modification of the coordinate input indicator according to the first embodiment of the present invention.

As shown in FIG. 6, a transparent cushioning member 48 made of a transparent viscoelastic member such as a silicone rubber or transparent elastic member such as an elastomer may be interposed between the light-emitting element 41 and cap 46. That is, the cap 46 may be attached to the light-emitting element 41 via the transparent cushioning member 48. This structure can lessen shocks generated by pressing the cap 46 at the distal end of the indicator 4 against the screen 10 in inputting coordinates. By managing the transparent cushioning member 48 at a constant thickness, the gap between the light-emitting element 41 and cap 46 can be easily kept constant using the light-emitting element 41 as a reference. As a result, variations between products can be suppressed.

In the structure shown in FIG. 6, no space but the transparent cushioning member 48 exists between the light-emitting element 41 and cap 46 covering the element 41. The transparent cushioning member 48 lessens shocks without directly applying, to the light-emitting element 41, an external force generated by pressing the cap 46 at the distal end of the indicator 4 against the screen 10.

By covering the light-emitting element 41 with the cap 46 made of a transparent material, the light-emitting element 41 can be prevented from being worn and scratched.

To reduce wear or scratches of the cap 46 caused by contact with the screen 10, the cap 46 may be formed from such a material as to reduce the coefficient of friction against the screen 10 while keeping the transparency (full-beam transmittance) of the material of the cap 46 constant or higher.

For example, in molding a thermoplastic resin, a lubricant or the like used to improve the flowability and facilitate processing or facilitate release of a molded piece from a mold is generally added. This lubricant can be added in the transparent material for forming the cap 46 to reduce the frictional resistance between the cap 46 and screen 10. Examples of the lubricant are a vaseline-silicone grease and colloidal silica. Other examples are a higher fatty acid, higher alcohol, fatty ester, glyceride, fatty amid, composite plastic molding lubricant (lubricant for a food container and medical plastic product made of polyvinyl chloride, polyolefin, and the like), and a mixture of them.

As the adding method, the lubricant may be mixed in polymerization, or may be thermally fused and mixed by an extrusion machine. The content is appropriately about 1,000 ppm in order not to greatly influence the full-beam transmittance, but may be increased to enhance slip characteristics. However, if the content is excessively high, the transparent material of the cap 46 yellows and is influenced by some emission wavelengths. In this case, an additive for changing the material into a color tone (e.g., blue) free from any influence is desirably simultaneously added.

Figure 7:
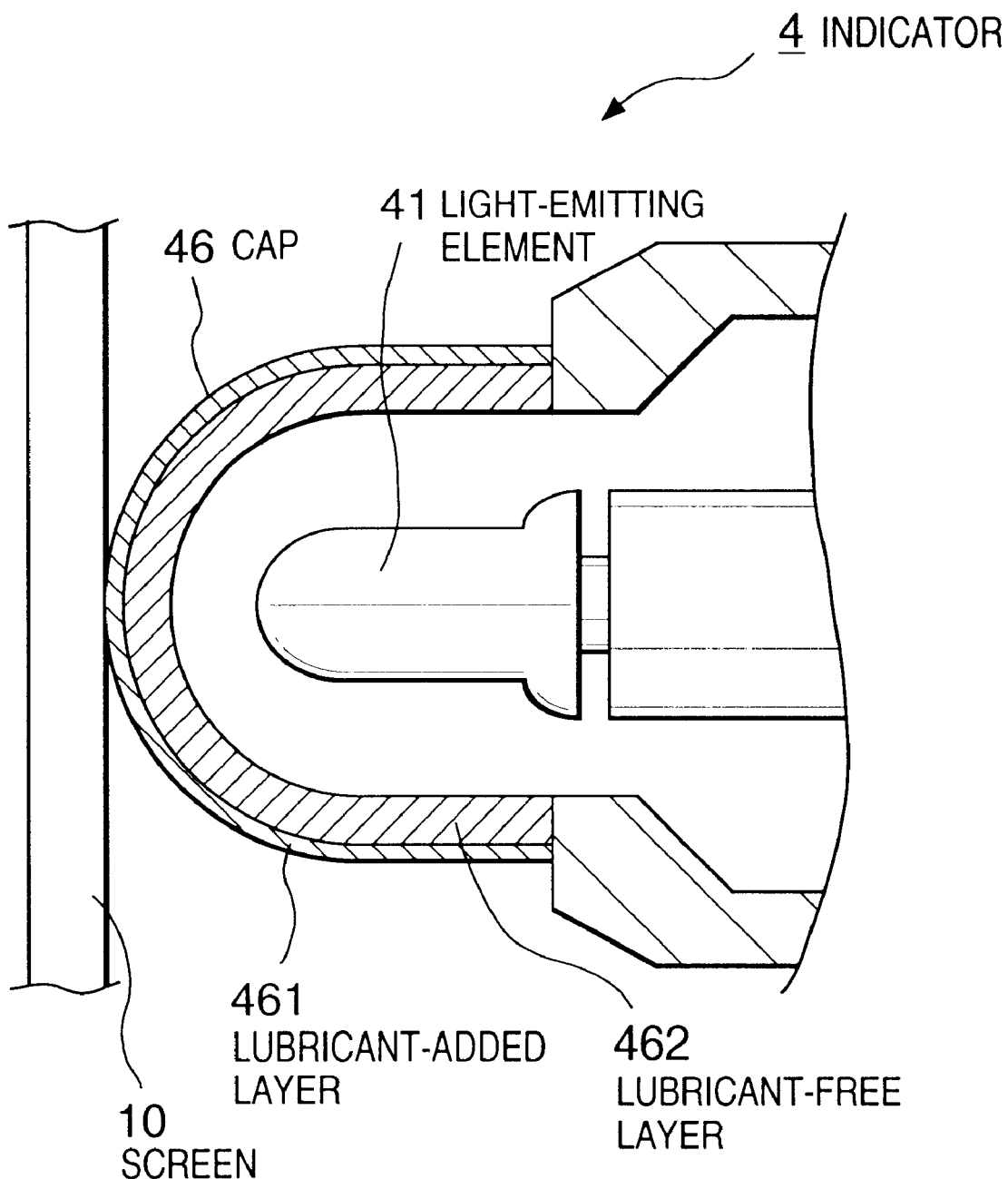
FIG. 7 is a sectional view showing the structure of the distal end of still another modification of the coordinate input indicator according to the first embodiment of the present invention.

To reduce the influence of the added lubricant on the full-beam transmittance, a lubricant-added layer 461 may be formed as only the outer surface layer of the cap 46 which will contact the screen 10, and a lubricant-free layer 462 not containing any lubricant may be formed as the inner layer on the light-emitting element 41 side, as shown in FIG. 7. This two-layered structure can enhance slip characteristics at a contact portion with the screen 10 and reduce wear without decreasing the emission light quantity of the light-emitting element 41.

To reduce wear or scratches caused by contact with the screen 10, a coating material mainly containing an acrylic compound may be ultraviolet-radiated. Alternatively, a cured coating layer which increases the surface hardness by a silicone-based coating material may be formed as the surface layer, and an uncured layer may be formed as an inner layer.

Figure 8A:
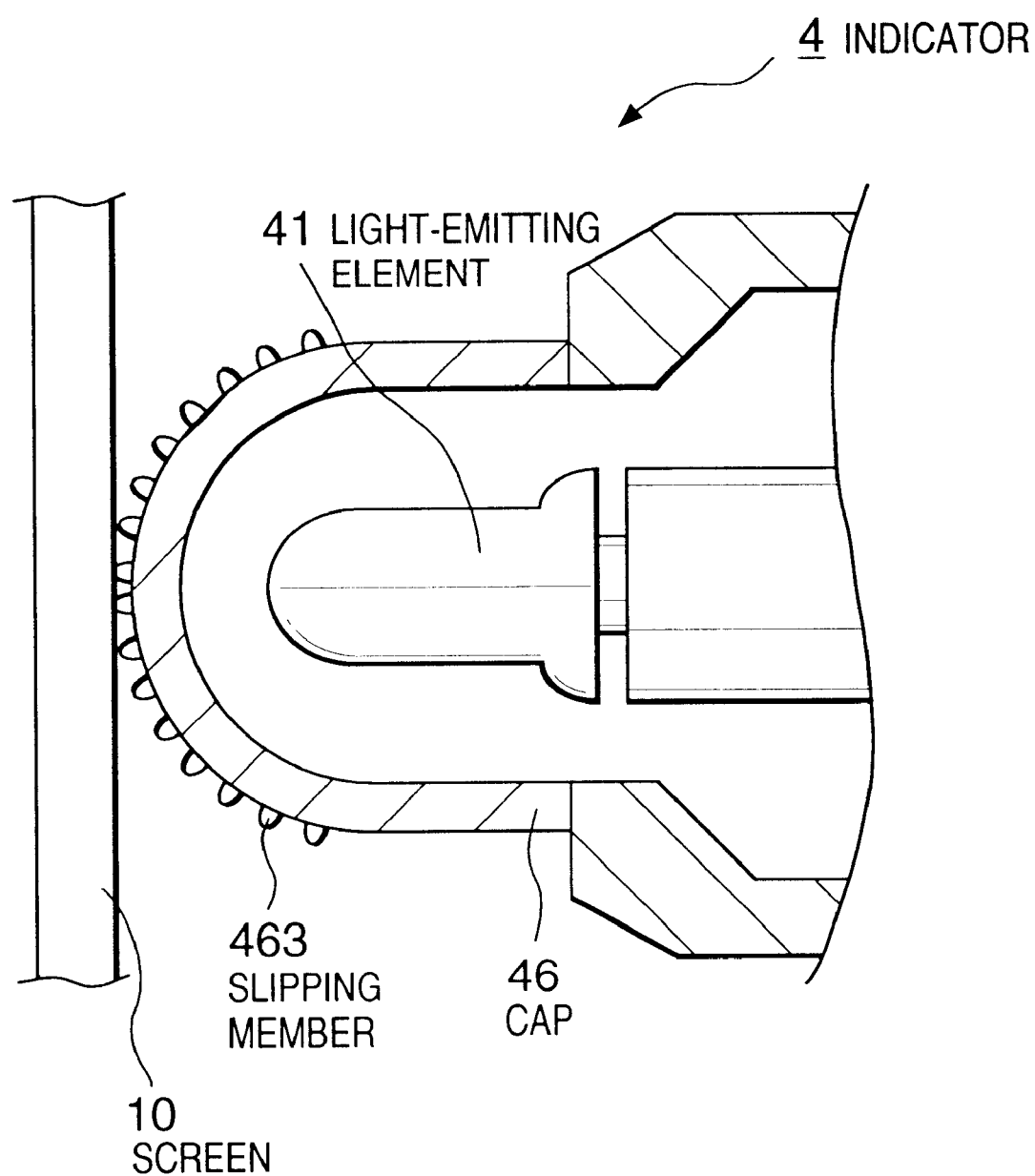
FIG. 8A is a sectional view showing the structure of the distal end of still another modification of the coordinate input indicator according to the first embodiment of the present invention.
Figure 8B:
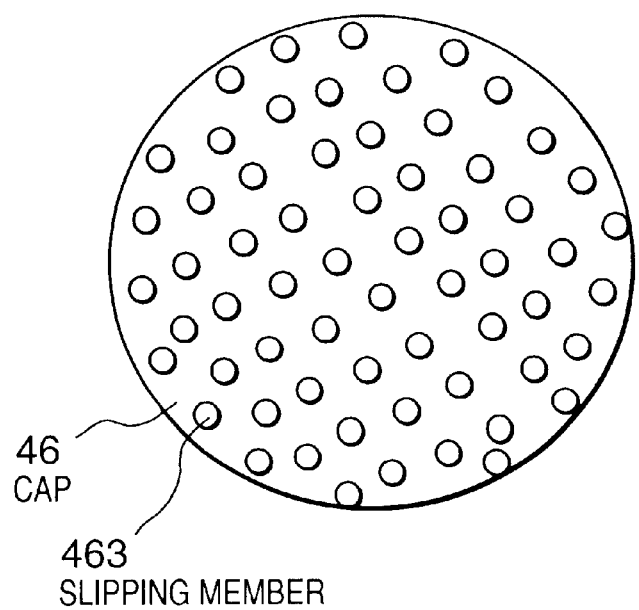
FIG. 8B is a top view showing the structure of the distal end of still another modification of the coordinate input indicator according to the first embodiment of the present invention.
Figure 8C:
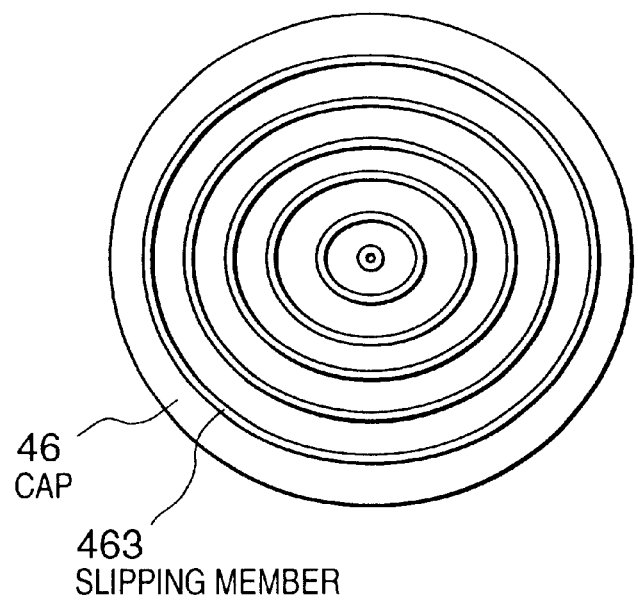
FIG. 8C is a top view showing the structure of the distal end of still another modification of the coordinate input indicator according to the first embodiment of the present invention.

The lubricant or the like added in the cap 46 as a material for reducing the coefficient of friction may be integrally added in the material, e.g., transparent resin for forming the cap 46, and uniformly fused to attain almost uniform optical characteristics. Instead, as shown in FIG. 8A, small grained (bead-like) slipping members 463 made of an additive mainly containing the lubricant may be interspersed on the outer surface of the cap 46. Only the slipping members 463 may point-contact the screen 10 in directly inputting coordinates. FIG. 8B is a front view of the cap 46 in this case. As shown in FIG. 8C, the slipping members 463 may be formed in circular lines when the cap 46 is similarly viewed from the front. A plurality of slipping members 463 may be concentrically laid out on the outer surface of the cap 46, and may contact the screen in directly inputting coordinates.

This arrangement can provide slip characteristics when the cap 46 contacts the screen 10. Since the slipping members 463 low in transparency exist as points or lines, the area of the slipping members 463 is small enough not to greatly influence the emission light quantity of the light-emitting element 41. At the same time, the slipping members 463 reflect light from the light-emitting element 41 to obtain proper diffusion characteristics. This is effective for defocusing a light spot on an optical imaging system (to be described later) and enlarging the input angle range of the indicator 4.

Figure 9:
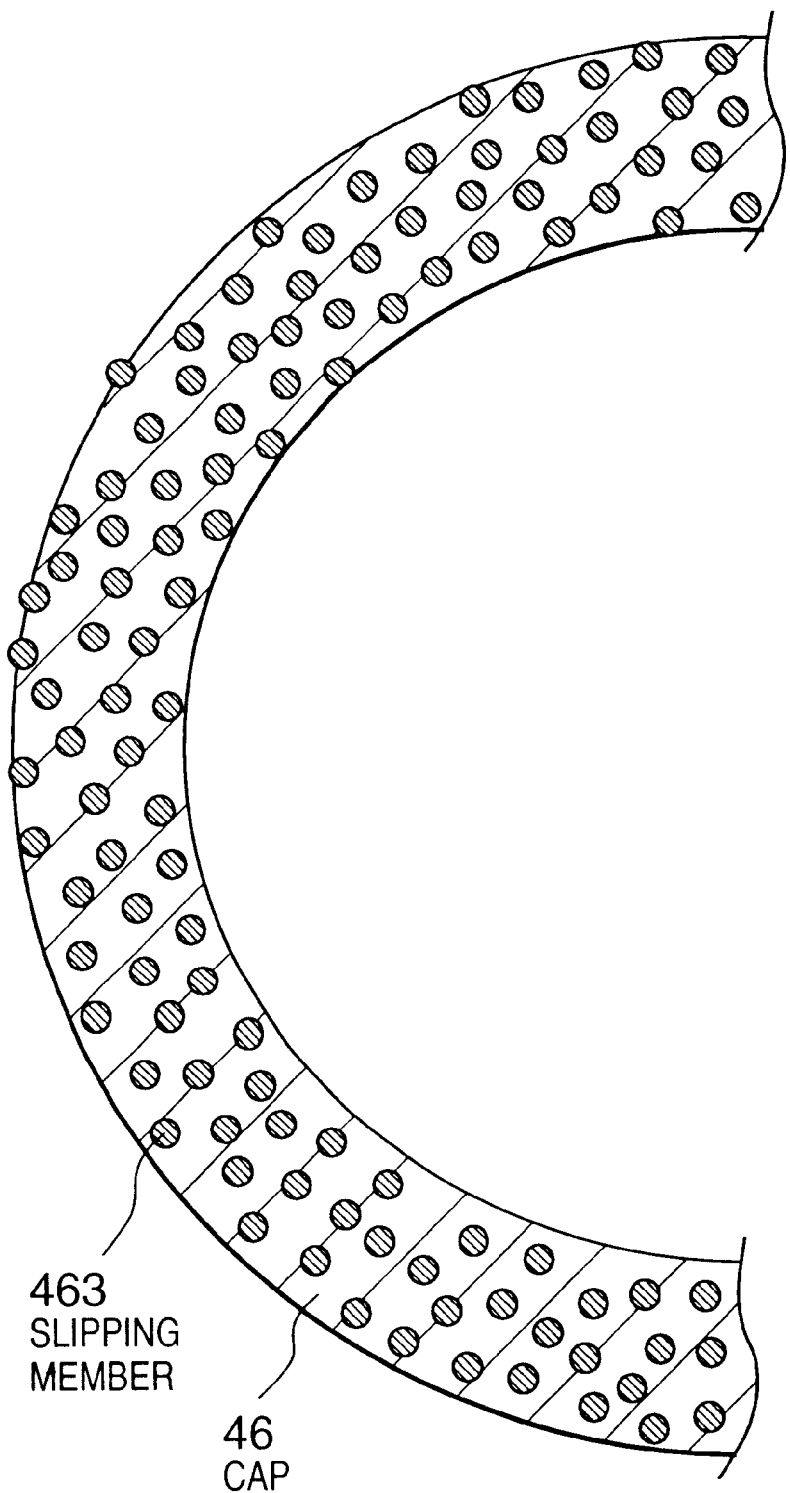
FIG. 9 is a sectional view showing the structure of the distal end of still another modification of the coordinate input indicator according to the first embodiment of the present invention.

FIG. 9 shows the grained slipping members 463 dispersed and added not only in the surface of the cap 46 but also in the direction of thickness. Even if the cap 46 having this structure wears owing to friction against the screen 10, the cap 46 can keep slip characteristics and obtain good operability and emission characteristics because the slipping members 463 always exist inside the cap 46.

Since the outer surface of the cap 46 mainly contacts the screen 10, the grained slipping members 463 may be dispersed at a higher density on a portion nearer the outer surface of the cap 46, as shown in FIG. 10.

In this fashion, the lubricant-added transparent material is used as the material of the cap 46, or the grained or linear slipping members 463 mainly containing the lubricant are formed on the cap 46. In inputting coordinates by directly pressing the cap 46 against the screen 10, particularly in inputting coordinates with rubbing by stroke operation such as character input and drawing, the cap 46 slips well because of a small coefficient of friction. As a result, wear or scratches of the cap 46 and screen 10 can be reduced, the light quantity can always be stably emitted and detected, and a decrease in coordinate detection precision can be prevented. Since the indicator 4 slips well on the screen 10 in inputting coordinates, a user can use the indicator 4 with high operability without any unsmoothness.

<Description of Arrangement of Coordinate Detector 1>

Figure 11:
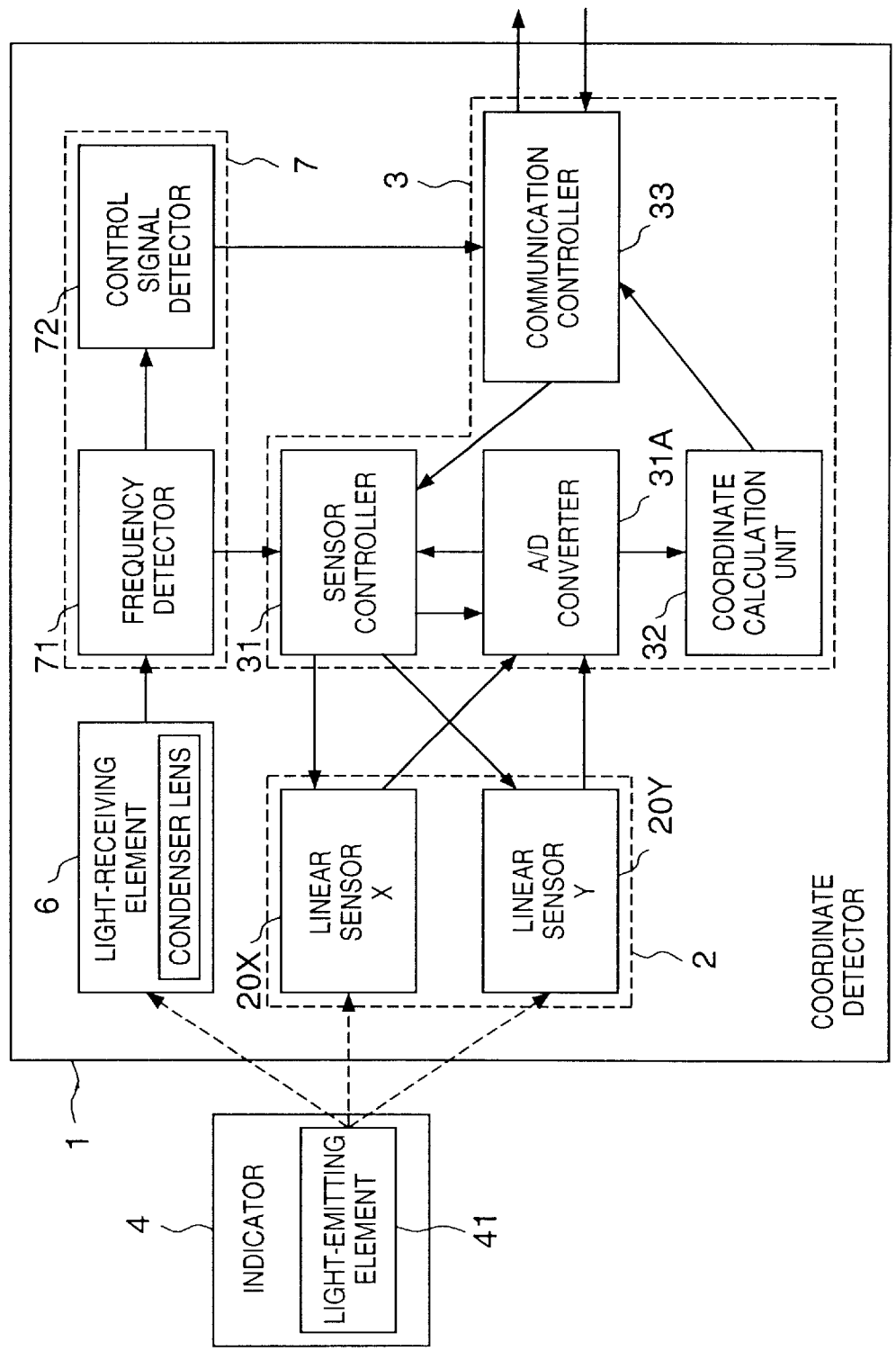
FIG. 11 is a block diagram showing in more detail the arrangement of a coordinate detector in FIG. 1 according to the first embodiment of the present invention.

The arrangement of the coordinate detector 1 will be described with reference to FIG. 11. As shown in FIG. 11, the coordinate detector 1 comprises the light-receiving element 6 for detecting the light quantity with an optical condensing system (to be described below) at a high sensitivity in order to detect the above-mentioned control signal, and two linear sensors 20X and 20Y (corresponding to the coordinate sensor 2 in FIG. 1) for detecting the incoming direction of light with an optical imaging system (to be described below) in order to detect coordinates. The coordinate detector 1 receives diffused light from the light spot 5 formed on the screen 10 by a light beam from the light-emitting element 41 of the indicator 4. The coordinate detector 1 comprises a frequency detector 71 and control signal detector 72 which constitute the signal processor 7 in FIG. 1, and a sensor controller 31, A/D converter 31A, coordinate calculation unit 32, and communication controller 33 which constitute the controller 3 in FIG. 1. These units process an optical output signal from the light-receiving element 6 to detect the above-described control signal, and control the linear sensors 20X and 20Y to process their output signals and calculate coordinates. A signal processing system of processing an output signal from the light-receiving element 6 to detect a control signal, the arrangement and signal processing system of the linear sensors 20X and 20Y, and calculation of coordinate values will be sequentially explained in detail.

<Description of Signal Processing System of Light-Receiving Element 6>

The signal processing system of the light-receiving element 6 will be explained in detail. The light-receiving element 6 has a condenser lens 6a (see FIG. 1) serving as an optical condensing system, which detects the light quantity of a predetermined wavelength at a high sensitivity from the entire range on the screen 10. A detection output is detected by the frequency detector 71 in FIG. 11, and demodulated by the control signal detector 72 into a digital signal containing data such as a control signal (signal superposed on an emission signal by the emission controller 42 of the indicator 4).

Figure 12:
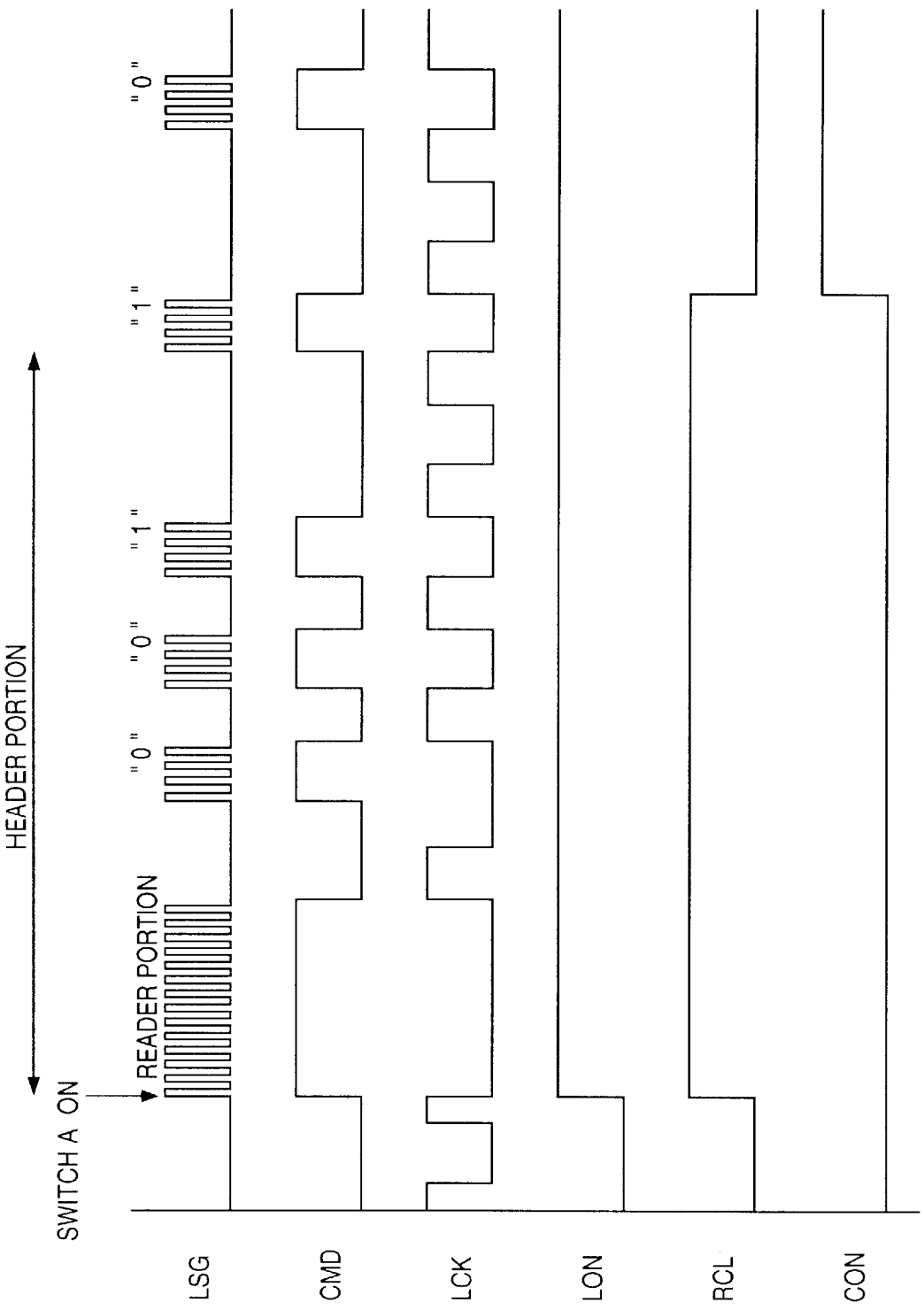
FIG. 12 is a timing chart for explaining operation of reconstructing a control signal from an output signal from the light-receiving element of the coordinate detector 1 according to the first embodiment of the present invention.

FIG. 12 is a timing chart for explaining control signal reconstruction operation. An optical output signal from the indicator 4 that contains a data signal made of the above-described bit sequence is detected by the light-receiving element 6 as an optical output signal LSG, and the optical output signal LSG is detected by the frequency detector 71. The frequency detector 71 is tuned to the pulse cycle of the first frequency highest in the optical output signal LSG. The frequency detector 71 demodulates a modulated signal CMD using an optical filter without any influence of disturbance light. This detection method is also adopted in a popular infrared remote controller, and is a high-reliability radio communication method.

In the first embodiment, the first frequency is 60 kHz in a higher band than in, e.g., the general infrared remote controller so as to prevent any malfunction even when the indicator 4 is used at the same time as the controller. Note that the first frequency may be selected from the same band as in the general infrared remote controller. In this case, malfunction is prevented by identifying the indicator 4 by the ID or the like.

The modulated signal CMD detected by the frequency detector 71 is interpreted as digital data by the control signal detector 72, and reconstructed into a control signal such as the above-mentioned pen-down or pen button signal. The reconstructed control signal is transmitted to the communication controller 33.

The code modulation cycle as the second frequency included in the modulated signal CMD is detected by the sensor controller 31, and the linear sensors 20X and 20Y are controlled using this signal. More specifically, the sensor controller 31 is reset at the timing of the header portion shown in FIG. 12, and generates a signal LCK phase-locked with the fall of the modulated signal CMD. The generated signal LCK is, therefore, a signal having a predetermined frequency in synchronism with the presence/absence of emission from the indicator 4.

A signal LON representing the presence/absence of an optical input, and a sensor reset signal RCL enabled by the signal LON are generated from the modulated signal CMD. While the sensor reset signal RCL is at high level, the two linear sensors 20X and 20Y are reset and start synchronous integration operation (to be described below) at the fall timing of the sensor reset signal RCL synchronized with the rise of the signal LCK.

When the control signal detector 72 detects the header portion to confirm not another device or noise but the start of an input from the indicator 4, the confirmation signal is transmitted from the communication controller 33 to the sensor controller 31. A signal CON representing valid operation of the linear sensors 20X and 20Y is set to high level, and the coordinate calculation unit 32 starts operating.

Figure 13:
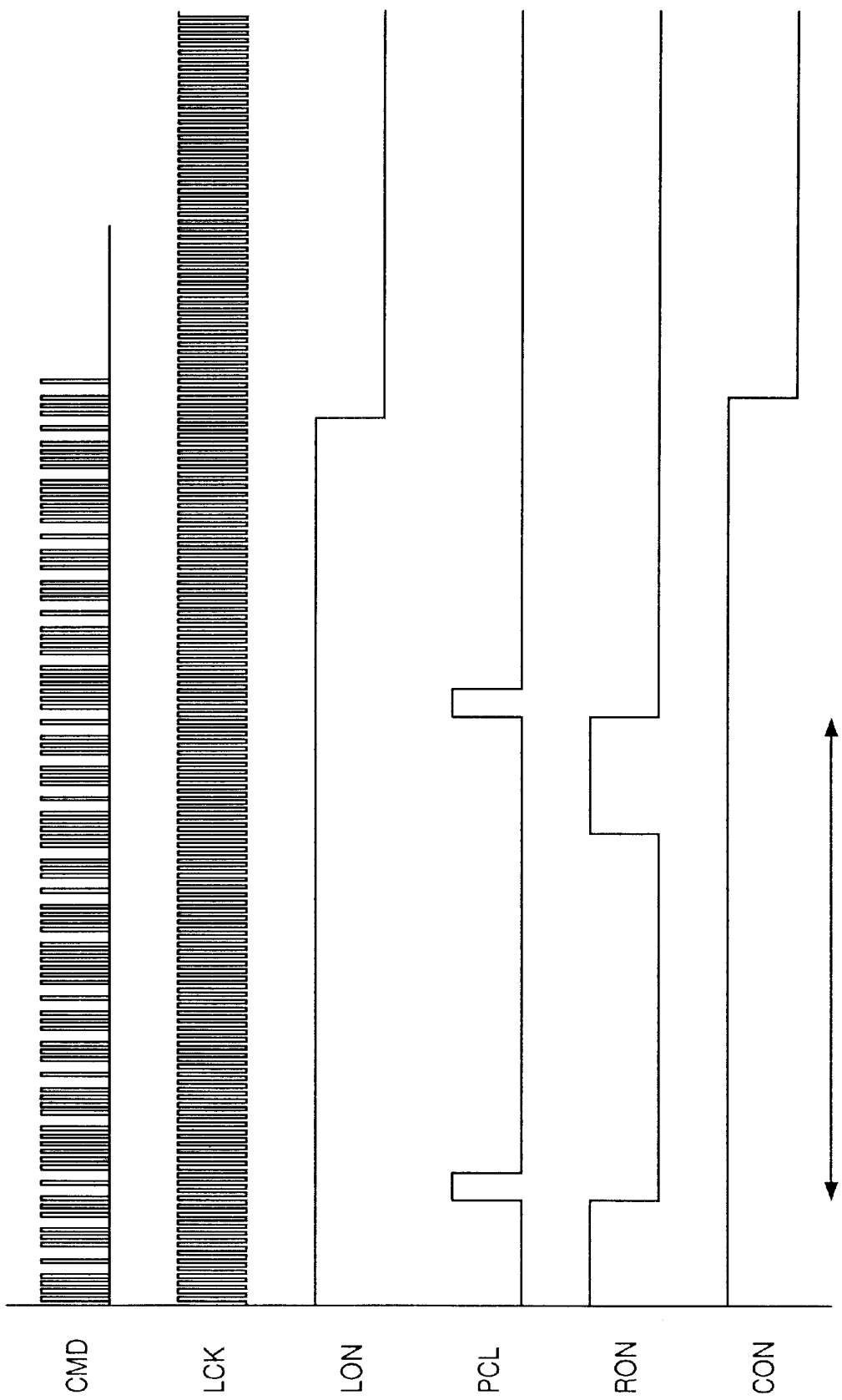
FIG. 13 is a timing chart at the end of a series of operations of reconstructing a control signal from an output signal from the light-receiving element according to the first embodiment of the present invention.

FIG. 13 is a timing chart showing the respective signals at the end of a series of reconstruction operations after no signal LSG is output. As shown in FIG. 13, if the modulated signal CMD detected from the optical output signal LSG is kept at low level for a predetermined time or more, the signal LON representing the presence/absence of an optical input changes to low level, and the signal CON representing valid sensor operation also changes to low level. As a result, the linear sensors 20X and 20Y complete coordinate output operation.

<Description of Arrangement and Signal Processing System of Linear Sensors>

Figure 14:
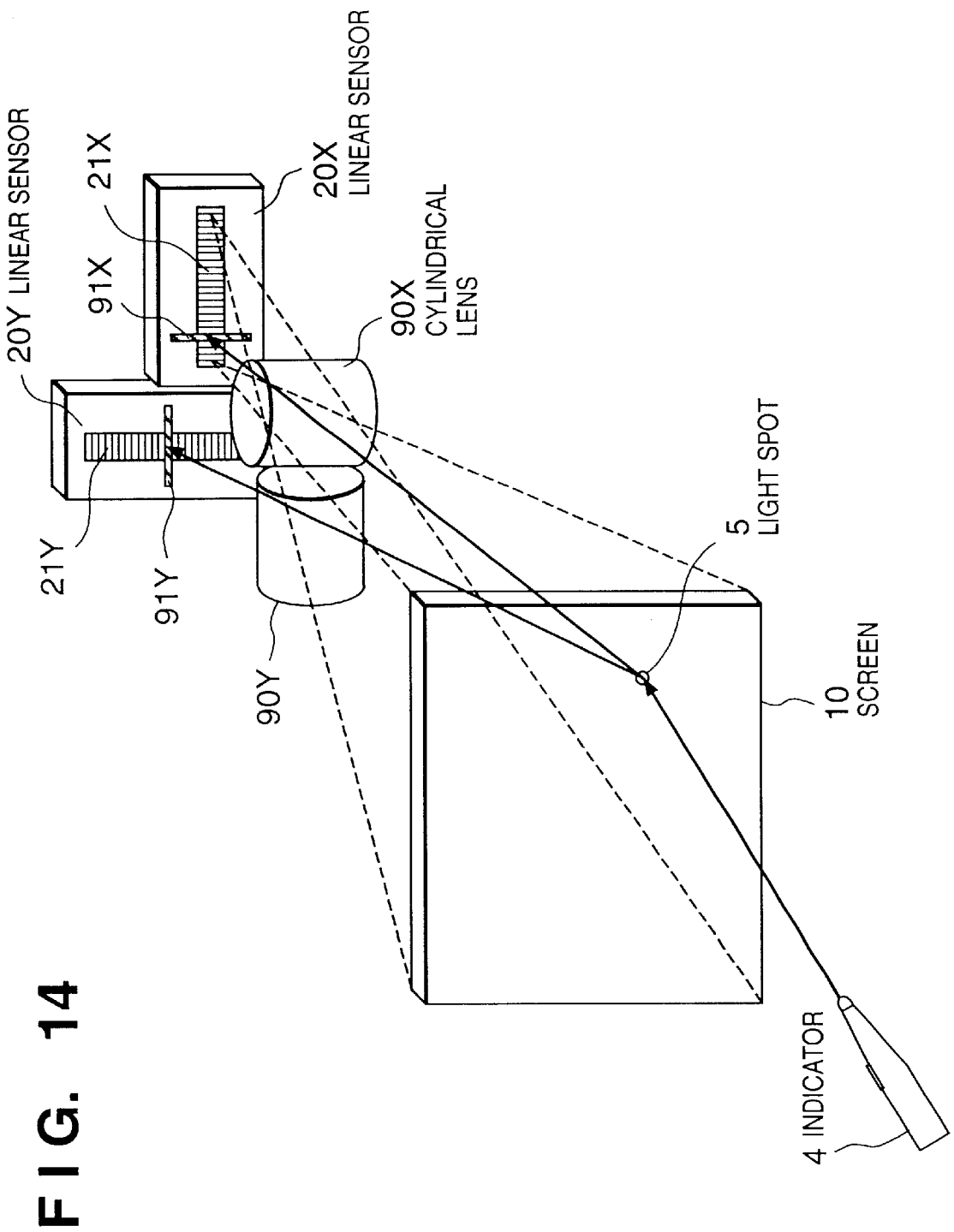
FIG. 14 is a perspective view showing the layout relationship between two linear sensors and cylindrical lenses of the coordinate detector according to the first embodiment of the present invention.

The arrangement and signal processing system of the linear sensors 20X and 20Y will be explained in detail. FIG. 14 shows the layout relationship between the linear sensors 20X and 20Y and optical imaging system. As shown in FIG. 14, an image of the light spot 5 on the screen 10 is formed into linear images 91X and 91Y on photosensors (sensor arrays) 21X and 21Y of the linear sensors 20X and 20Y via cylindrical lenses 90X and 90Y serving as an optical imaging system. The two sensors 20X and 20Y and lenses 90X and 90Y can be accurately arranged at a right angle to obtain outputs having a peak at a pixel reflecting X- and Y-coordinates.

These two sensors 20X and 20Y are controlled by the sensor controller 31 in FIG. 11. Output signals from the sensors 20X and 20Y are converted into digital signals by the A/D converter 31A connected to the sensor controller 31. The digital signals are sent to the coordinate calculation unit 32 where output coordinate values are calculated. The calculation results are output to an external device (not shown) such as a computer via the communication controller 33 by a predetermined communication method together with data such as a control signal from the control signal detector 72. In irregular operation such as adjustment (e.g., setting the user calibration value), the communication controller 33 sends a mode switching signal to the sensor controller 31 and coordinate calculation unit 32.

The first embodiment intentionally makes an image of the light spot 5 out of focus by focus adjustment so as to make the image width several times the pixel of each of the linear sensors 20X and 20Y. Experiments using a 1.5-mm-φ plastic cylindrical lens, linear CCD with a pixel pitch of about 15 μm and 64 effective pixels, and infrared LED revealed that the sharpest image formed had an image width of 15 μm or less over the entire screen having a view angle of about 40°, and inter-pixel division results distorted stepwise in this state. When the lens position was adjusted to set an image width to about 30 to 60 μm, very smooth coordinate data was obtained. If an image is made out of focus greatly, the peak level decreases. Therefore, a CCD with a small number of pixels and a properly defocused optical system are used, which is one of points of the first embodiment. This combination can realize a high-resolving-power, high-precision, high-speed, and low-cost coordinate input apparatus with a small calculation data amount using a small-size sensor and optical system.

Figure 15:
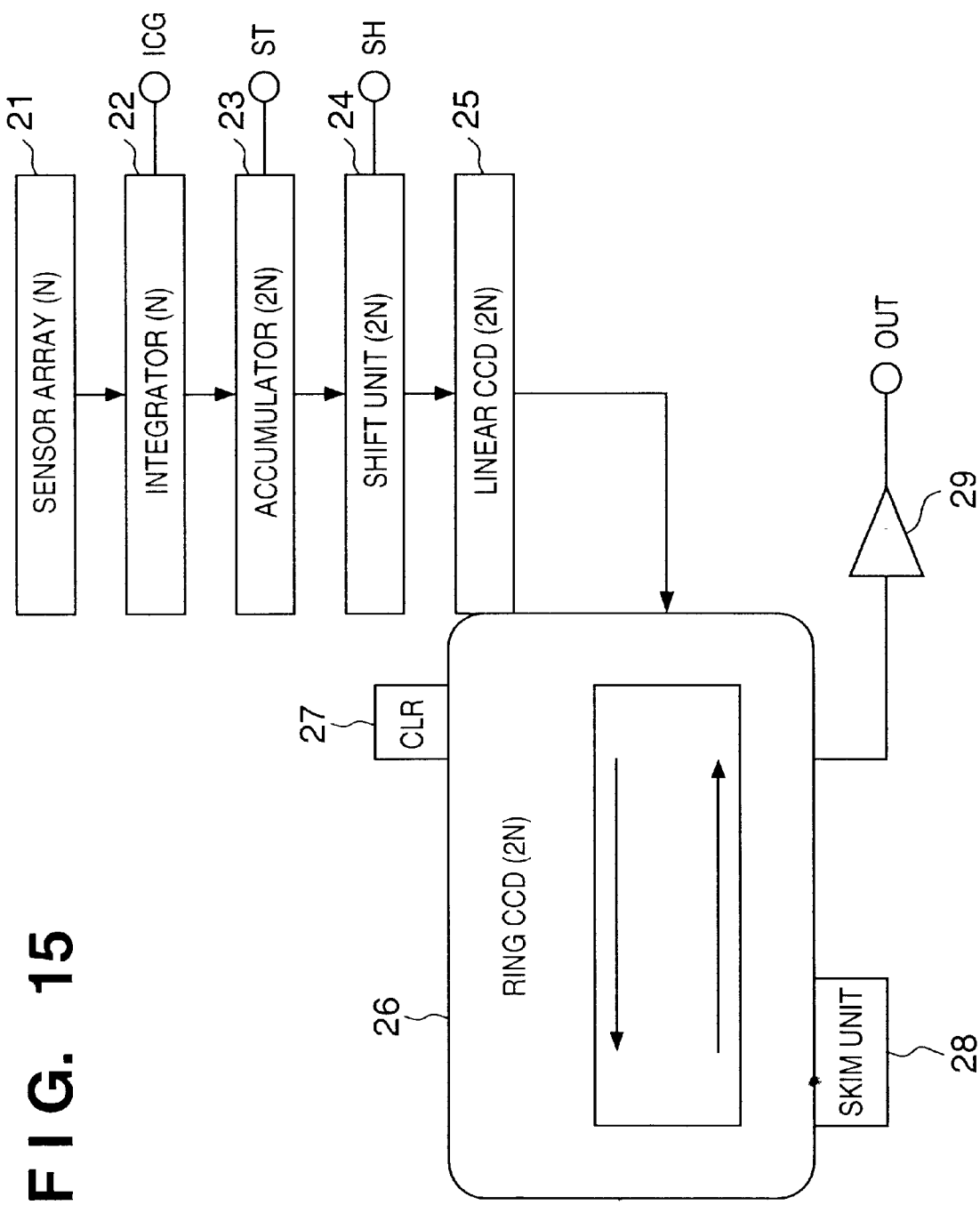
FIG. 15 is a block diagram showing the internal arrangement of each linear sensor according to the first embodiment of the present invention.

The X- and Y-coordinate detection linear sensors 20X and 20Y each laid out in an array have the same arrangement. FIG. 15 shows the internal arrangement. A sensor array 21 serving as a light-receiving portion is made up of N pixels (e.g., 64 pixels). Charges corresponding to the light reception amount are accumulated in N integrators 22. Since the integrators 22 can be reset by applying a voltage to a gate ICG, they can operate as an electronic shutter. The charges accumulated in the integrators 22 are transferred to 2N accumulators 23 by applying a pulse voltage to an electrode ST. The charges are separately accumulated in the accumulators 23 in correspondence with H (High-level) and L (Low-level) states of the signal LCK synchronized with the emission timing of the indicator 4. The charges separately accumulated in synchronism with flashing of light are transferred to 2N linear CCDs 25 via 2N shift units 24 arranged for simplifying a transfer clock.

Charges corresponding to flashing of light output from the N-pixel sensor are stored adjacent to each other in the linear CCDs 25. The charges in the linear CCDs 25 are sequentially transferred to 2N ring CCDs 26. The ring CCDs 26 are reset by a CLR unit 27 in accordance with a signal RCL, and then sequentially accumulate the charges from the linear CCDs 25.

The charges accumulated in this manner are read out by an amplifier 29. The amplifier 29 non-destructively outputs a voltage proportional to the accumulated charge amount. In practice, the amplifier 29 amplifies and outputs the difference between adjacent charge amounts, i.e., the value obtained by subtracting a charge amount in the ON state of the light-emitting element 41 from a charge amount in the OFF state.

Figure 16:
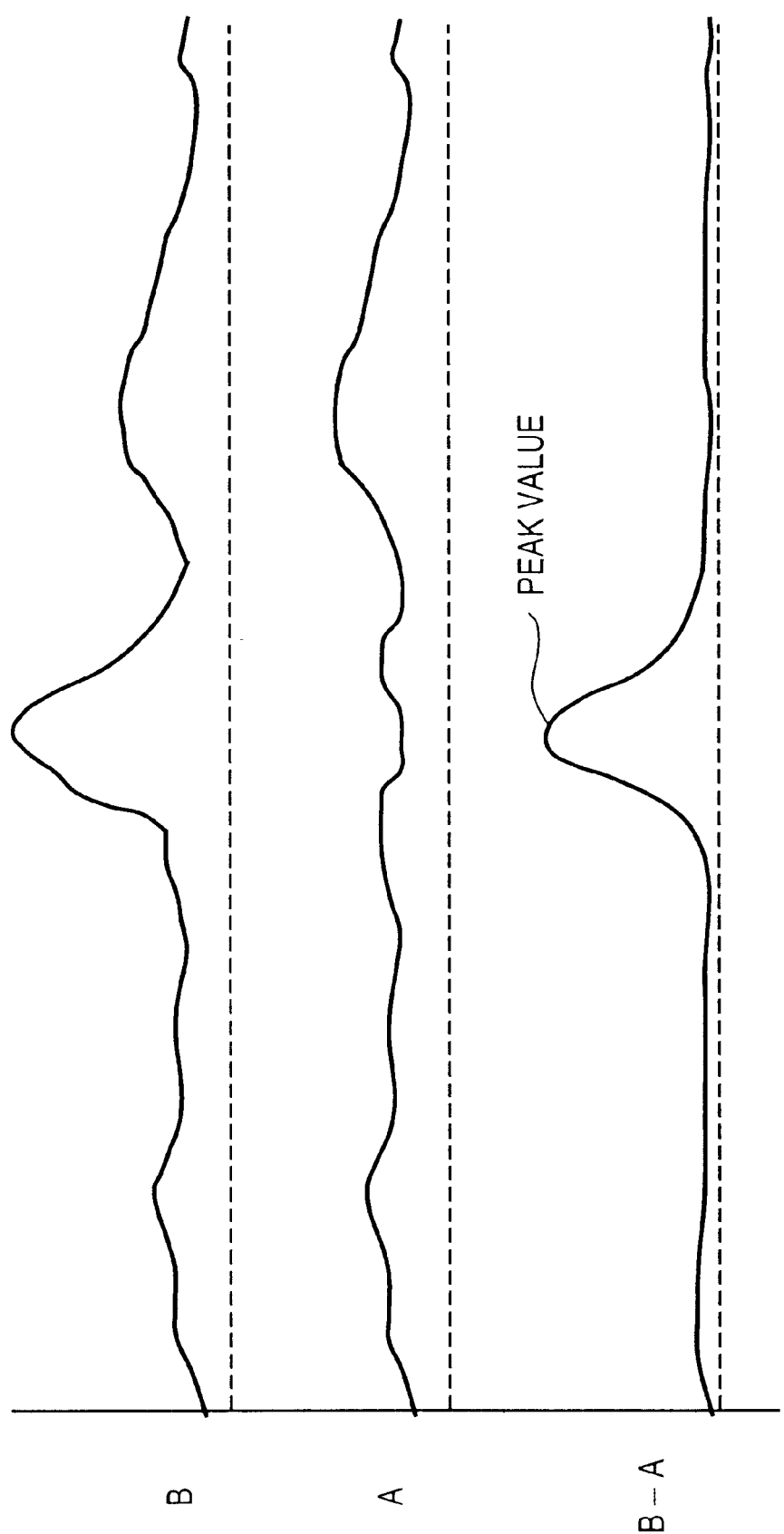
FIG. 16 is a waveform chart showing an example of the output waveform of the linear sensor according to the first embodiment of the present invention.
Figure 17:
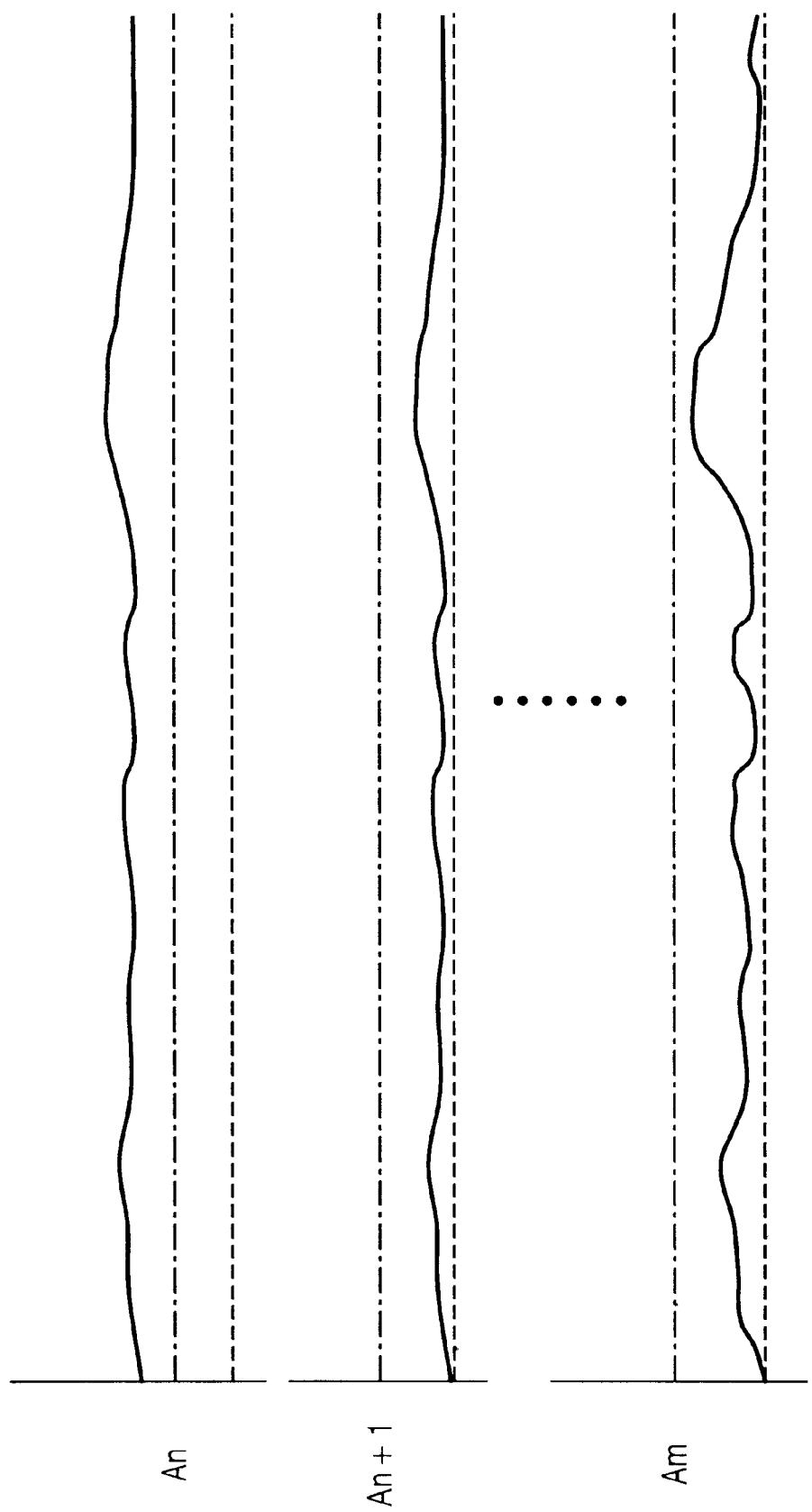
FIG. 17 is a waveform chart showing skim operation of the linear sensor according to the first embodiment of the present invention.

FIG. 16 shows an example of the output waveforms of the linear sensors 20X and 20Y obtained in this case. In FIG. 16, a waveform B is a waveform of only readout signals in the ON state of the light-emitting element 41, and a waveform A is a waveform in the OFF state, i.e., waveform of only disturbance light (as shown in FIG. 15, pixel charges corresponding to the waveforms A and B are accumulated adjacent to each other in the ring CCDs 26). The amplifier 29 non-destructively amplifies and outputs the difference value (waveform B−A) between adjacent charge amounts. Consequently, an image signal of only light from the indicator 4 can be obtained, and coordinates can be stably input without any influence of disturbance light (noise).

Let the maximum value of the waveform B−A shown in FIG. 16 be a PEAK value. If the accumulation time during which the sensor functions in response to light is increased, the PEAK value increases in accordance with the time. In other words, if a time corresponding to one cycle of the signal LCK is defined as a unit accumulation time, and the accumulation count n is defined using the unit accumulation time, the PEAK value can be increased by increasing the accumulation count n. By detecting that the PEAK value reaches a predetermined value TH1, a constant output waveform can always be obtained.

When disturbance light is very strong, the transfer charges of the ring CCDs 26 may be saturated before the peak of the difference waveform B−A satisfactorily increases. Considering this situation, the sensor comprises a skim unit 28 having a skim function. The skim unit 28 monitors the level of an OFF signal, and when the signal level exceeds a predetermined value in the nth An (chain line in FIG. 16), extracts a predetermined amount of charges from pixels corresponding to A and B. In the next (n+1)th An, the waveform changes to An+1. By repeating this operation, signal charges can be continuously accumulated without saturation even with very strong disturbance light. Even if the flashing light quantity is very small, a signal waveform having a sufficiently large magnitude can be attained by repeating integration operation many times. Especially when the indicator 4 uses a light source of the visible light range, a display image signal is superposed. Thus, a sharp waveform almost free from any noise can be obtained using the skim function and difference output.

Figure 18:
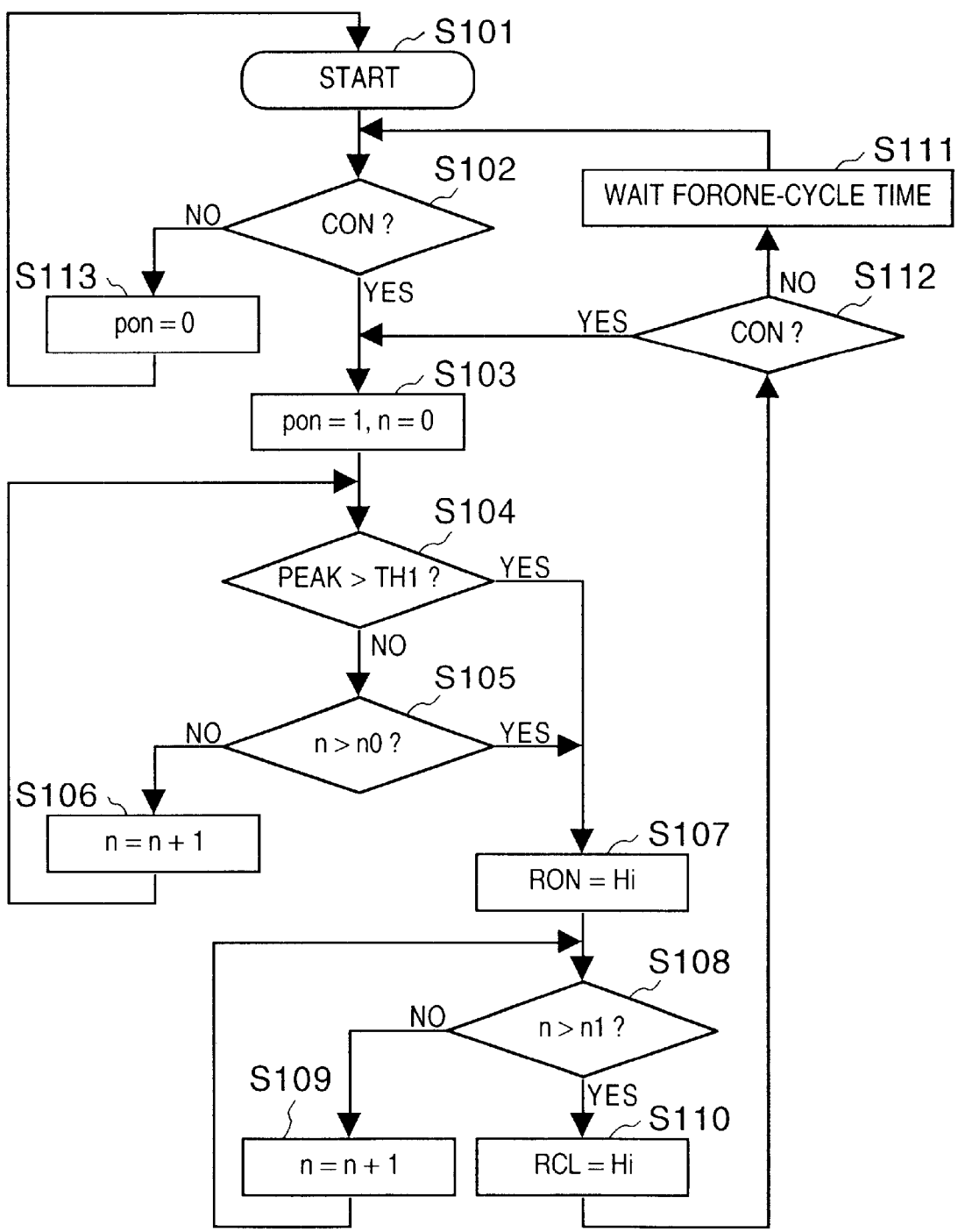
FIG. 18 is a flow chart showing the operation control procedures of the linear sensor according to the first embodiment of the present invention.

FIG. 18 is a flow chart showing a series of sensor control operations for the linear sensors 20X and 20Y by the sensor controller 31. As shown in FIG. 18, the sensor controller 31 starts sensor control operation in step S101, and monitors the signal CON in step S102. If the signal CON changes to high level, the sensor controller 31 sets a flag pon to 1 and resets the accumulation count n to 0 in step S103, and checks in step S104 whether the PEAK value (peak level) of a sensor output is higher than the predetermined value TH1.

If NO in step S104, the sensor controller 31 checks in step S105 whether the accumulation count n exceeds a first predetermined count n0. If NO in step S105, the flow shifts to step S106 to increment the accumulation count n by one, and returns to step S104. If YES in step S104 or S105, the flow advances to step S107 to set an integration stop signal RON to high level (H) and stop integration operation. Then, the coordinate calculation unit 32 starts calculating coordinate values.

If the accumulation count n exceeds a second predetermined count n1 in the count loop of steps S108 and S109, the integration stop signal RON changes to low level. At the same time, the sensor reset signal RCL changes to high level during several times (twice in FIG. 13) the cycle of the signal LCK. The flow shifts to step S112 to check whether the signal CON is at high level. While the signal CON is at high level, the operation in steps S103 to S112 is repeated, and coordinate values are calculated every cycle determined by the predetermined count n1.

In step S111, the flow waits for one cycle determined by the predetermined count n1 when the signal CON is at low level in step S112, so as to hold the state only once even if the signal CON drops out due to the influence of dust or the like. After that, the flow shifts to step S102. If the signal CON is kept at low level during two cycles, the flow advances from step S102 to step S113 to reset the flag pon to 0, waits for a sync signal, and returns to step S101.

This dropout can also be prevented by setting the holding time longer than one cycle. If disturbance is little, no dropout measure need be taken. Note that the same operation can be performed even if one cycle is set to a natural number multiple of the cycle of the above-mentioned data block so as to synchronize with the timing of the sync code, and a sync code detection signal is used instead of the signal CON.

Light from the indicator 4 which reaches the coordinate detector 1 varies depending on consumption of the power supply (battery) 44 incorporated in the indicator 4, and also varies depending on the posture of the indicator 4. In particular, when the light diffusion characteristics of the screen 10 are weak, the front luminance of a display image increases, but the input light quantity to the sensor depending on the posture of the indicator 4 greatly varies. According to the first embodiment, however, the number of times of integration can automatically follow even this state to always attain a stable output signal, and coordinates can be stably detected. When the indicator 4 is constituted using a semiconductor laser for a light-emitting element, as a laser pointer for emitting a light spot from a location apart from the coordinate input surface, a laser beam incident on the sensor without much scattering is very strong. Even in this case, coordinates can be stably detected.

When a pen type indicator using an LED used in direct contact with the screen and a laser pointer type indicator are used, the LED can have a larger light quantity. Whether the indicator is of a pen type or pointer type is determined by the ID signal to switch the integral counts n0 and n1 shown in FIG. 18. The sampling speed can be increased for the pen type indicator and decreased for the pointer type indicator. In practice, the pointer cannot draw fine images such as characters. By decreasing the sampling speed, smooth lines can be drawn with high convenience. This switching is, therefore, effective.

As described above, a high-frequency carrier is superposed on flashing light, and the integration operation timing is controlled by a modulated signal of a predetermined cycle obtained by detecting the frequency of the carrier. The indicator and imaging unit can be synchronized without any cord, and a high-convenience coordinate input apparatus can be realized. The indicator can be easily operated using a laser beam at a location apart from the display screen (coordinate input surface). In addition, the integration control means for stopping integration operation by detecting that the peak level in a difference signal from the integration means exceeds a predetermined level is employed. Even if the light quantity changes, a light spot image signal of almost constant level can be generated to always obtain a stable high-resolution coordinate calculation result.

<Description of Calculation of Coordinate Value>

Calculation of coordinate values in the coordinate calculation unit 32 will be explained.

Output signals from the two linear sensors 20X and 20Y (difference signal from the amplifier 29) are sent as digital signals via the A/D converter 31A arranged in the sensor controller 31 in FIG. 11 to the coordinate calculation unit 32 where coordinate values are calculated. Coordinate values (X1,Y1) on the sensor are calculated from output data in the X- and Y-coordinate directions. Note that X- and Y-coordinate values are calculated by the same processing, and only the X-coordinate value will be explained.

Figure 19:
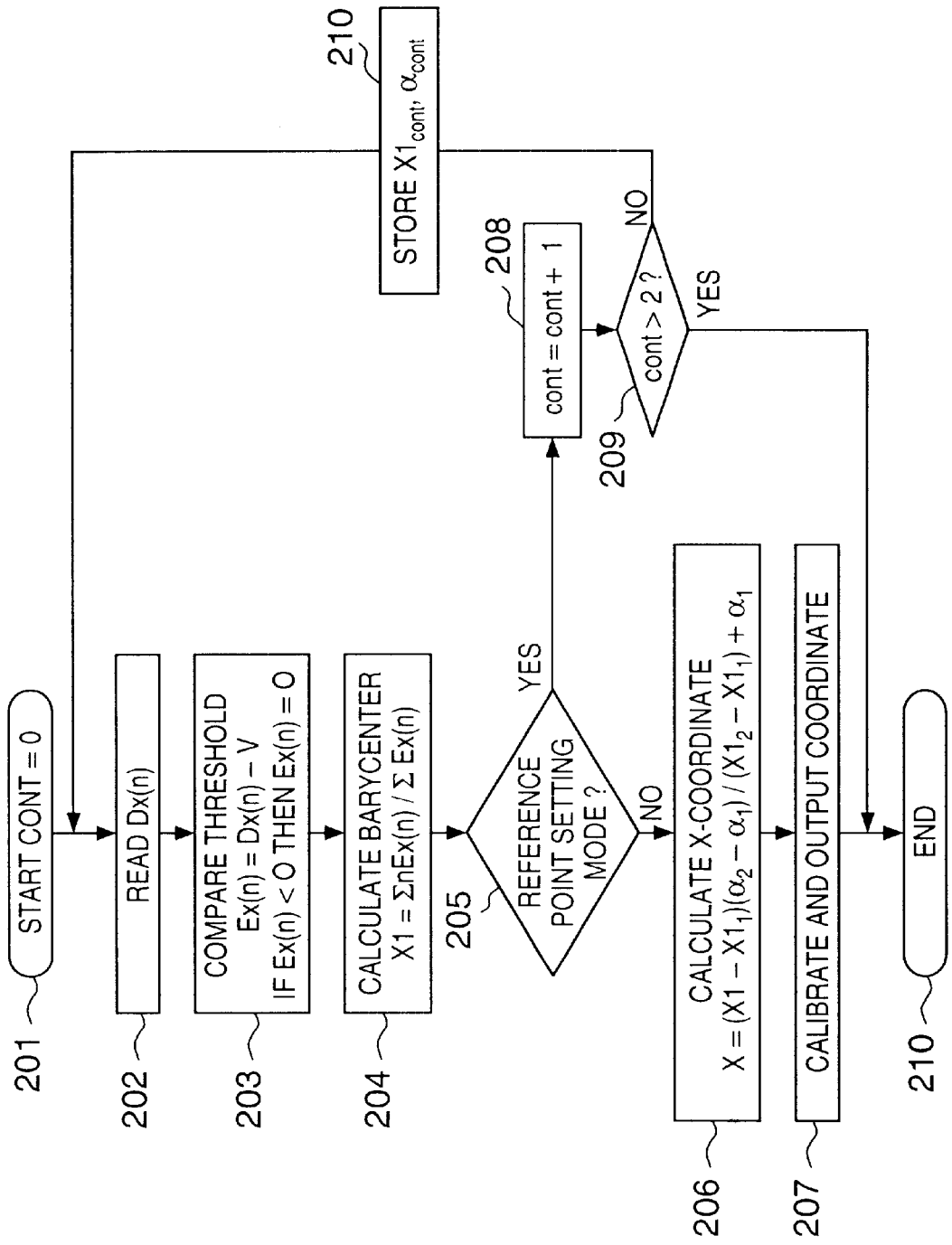
FIG. 19 is a flow chart showing the procedures of coordinate calculation in the coordinate detector according to the first embodiment of the present invention.

FIG. 19 is a flow chart showing the flow of coordinate calculation. As shown in FIG. 19, processing starts in step S201. In step S202, difference data Dx(n) (the number n of pixels=64 in the first embodiment) as difference signals of respective pixels at an arbitrary coordinate input point (known coordinate point in a reference point setting mode; to be described later) is read and stored in a buffer memory.

In step S203, the difference data Dx(n) is compared with a preset threshold V to derive a data value Ex(n) equal to or larger than the threshold. Using this data, a coordinate X1 on the sensor is calculated in step S204. In this embodiment, the barycenter of output data is calculated by barycenter calculus, but may be calculated by another calculation method such as a method (e.g., differential calculus) of obtaining the peak value of the output data Ex(n).

In step S205, the coordinate calculation mode is checked. To calculate a coordinate from the barycenter X1 of output data, a predetermined value must be obtained in advance. A method of deriving the predetermined value (reference point setting mode) will be described.

Similarly for only the X direction, the indicator 4 indicates the X- and Y-coordinates on the screen 10 at known points ($\alpha 1$, $\beta 1$) and ($\alpha 2$, $\beta 2$). The above processes in steps S202 to S204 are executed to derive as $X1_1$ and $X1_2$ barycenter values obtained at these points on the X-direction sensor. The barycenter values and known coordinate values $\alpha 1$ and $\alpha 2$ are stored in step S210. Using the stored values, the X-coordinate of a coordinate input point to be derived in step S206 can be calculated in normal coordinate calculation. In step S207, the coordinate value is calibrated (e.g., the distortion is corrected by software in order to correct the lens aberration of the optical system), as needed, in order to provide a higher-performance coordinate input apparatus. Then, the coordinate value is defined.

The defined coordinate can be output in real time, or data can be thinned out in accordance with an application purpose. Such processing is important when the following specifications and the like is considered.

The stability of a user's hand changes between the case of using the indicator 4 like a pen in contact with the screen (coordinate input surface) and the case of using the indicator 4 as a pointer apart from the screen. When the indicator 4 is used as a pointer, the cursor on the screen slightly tremble, and this slight tremble is desirably suppressed. When the indicator 4 is used like a pen, it faithfully, quickly follows the movement of the user hand as much as possible. Especially in writing characters, they cannot be correctly input unless the indicator 4 quickly operates.

In the first embodiment, since the ID is transmitted by a control signal, the ID allows determining whether the indicator 4 is of a pointer type and whether the switch 43B at the distal end is pressed. This also allows determining whether the indicator 4 is used as a pointer or pen. If the indicator 4 is used as a pointer, the moving average is calculated using preceding and second preceding output coordinate values (X-1,Y-1) and (X-2,Y-2), thereby obtaining current output coordinate values (X,Y). This provides high operability almost free from any shake. The first embodiment adopts a simple moving average. Alternatively, as a function used in this smoothing processing, various methods can be used such that a difference absolute value is nonlinearly compressed by its size, or the difference between the moving average and its predicted value is nonlinearly compressed. In short, smoothing can be switched by a control signal to be relatively strong when the indicator 4 is used as a pointer, otherwise, to be relatively weak. The indicator 4 can be effectively used in the respective states with high convenience.

Note that these calculation processes suffice to complete only within 10 msec for a coordinate sampling frequency of 100 Hz, as described above. Original data is as very small as 64 pixels×2 (X and Y)×8 bits of the A/D converter, and no convergence calculation is required. Thus, these processes can be satisfactorily achieved by a low-speed microprocessor of one 8-bit chip. This achieves low cost, easily changeable specifications, short development period, and various derivative goods which can be easily developed. No LSI dedicated for high-speed image data processing need be developed, unlike in the use of an area sensor, and the development cost and period can be greatly reduced.

A data signal representing coordinate values (X,Y) obtained by the above calculation is sent from the coordinate calculation unit 32 to the communication controller 33. The communication controller 33 receives the data signal and a control signal from the control signal detector 72. Both the data signal and control signal are converted into a communication signal in a predetermined format and transmitted to an external display control device such as a computer. This enables various operations for the cursor and menus on the screen 10 and input of characters and line drawings. Accordingly, there can be realized a coordinate input apparatus which can obtain a resolving power of 1,000 or more even when a sensor having 64 pixels is used, as described above, and uses only a compact, low-cost sensor and optical system and a very compact arithmetic circuit.

The numbers of pixels and calculation data required to double the resolving power are four times when the sensor is constituted as an area sensor, but the numbers of pixels for the X- and Y-coordinates can be twice when the sensor is constituted as a linear sensor. A higher resolving power can therefore be attained by increasing the number of pixels.

As is apparent from the above description, according to the first embodiment, the coordinate input indicator of the optical coordinate input apparatus is equipped with the cap made of a transparent material which covers the light-emitting element of the indicator for forming a light spot. This cap can prevent the light-emitting element from being worn and scratched. The irradiation light quantity and distribution of the light-emitting element can always be kept stable to prevent a decrease in coordinate detection precision of the coordinate input apparatus. The cap is attached to the main body of the indicator via a cushioning member or to the light-emitting element via a transparent cushioning member. This structure can prevent shocks applied to the cap during pressing the cap against the coordinate input surface so as to input coordinates. Further, the cap is made of a transparent material for reducing the coefficient of friction on the cap surface, or grained or linear slipping members mainly containing a lubricant are formed on the cap. This structure can reduce the coefficient of friction on the cap surface to prevent the light-emitting element and coordinate input surface from being worn and scratched, and can improve the operability of the indicator.

Second Embodiment

The second embodiment concerns a modification of the cap 46 of the indicator 4 in the first embodiment.

Figure 20:
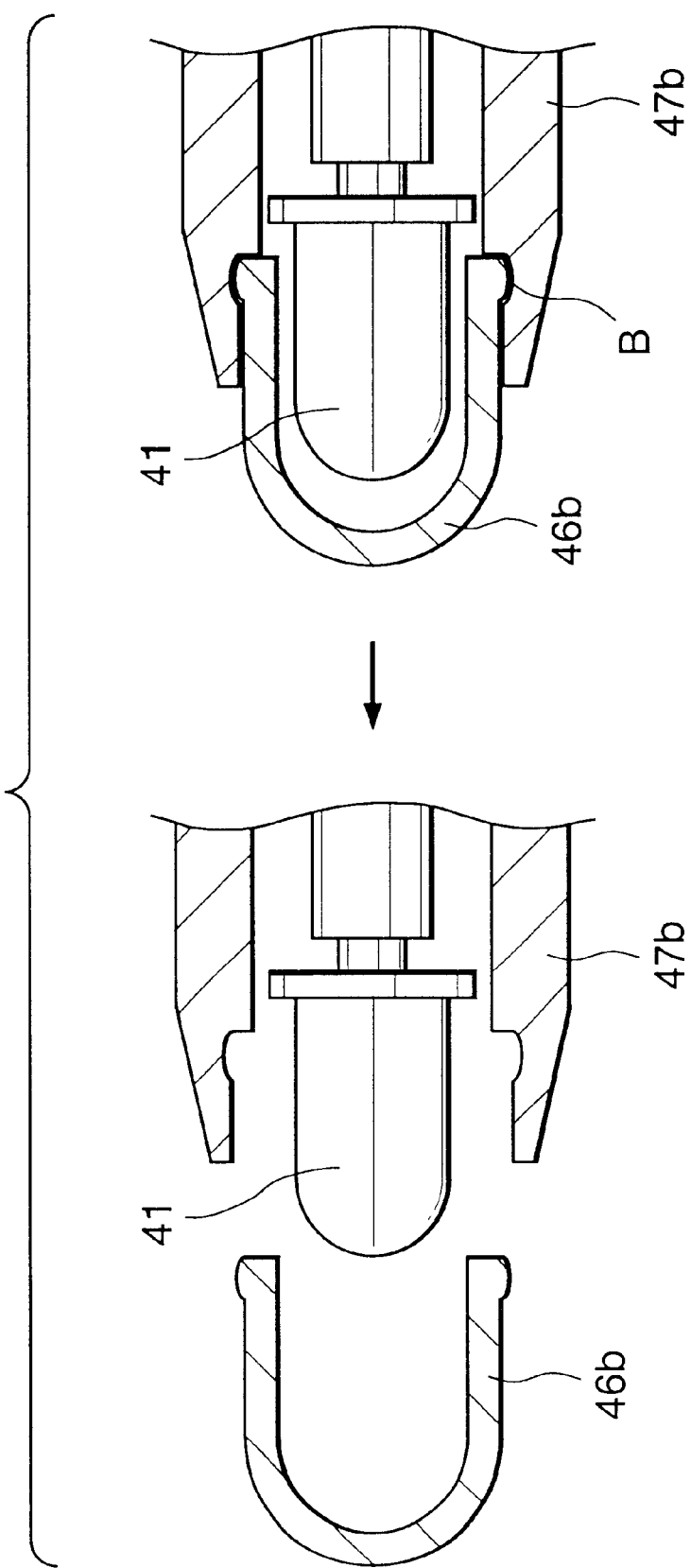
FIG. 20 is a sectional view showing the structure of the distal end of a coordinate input indicator according to the second embodiment of the present invention.

FIG. 20 is a view showing the detailed arrangement of a cap according to the second embodiment.

In an indicator 4, as shown in FIG. 20, a cap 46b made of a transparent material covers a light-emitting element 41. In FIG. 2, the cap 46 constitutes part of the operation switch 43B. However, the cap need not always constitute the switch as far as it covers the light-emitting element 41. FIG. 20 shows the basic arrangement of the cap 46b except for the switch portion (in this case, the pen-down function and the like are given to a switch attached to another portion of the indicator 4).

The cap 46 contacts a screen 10 when coordinates are input in a mode in which the distal end of the indicator 4 is directly brought into contact with the screen 10. This structure prevents the light-emitting element 41 such as an LED from directly contacting the screen 10. Since the cap 46 is attached while being spaced apart from the light-emitting element 41, an external force generated by directly pressing the cap 46 against the screen 10 is not applied to the light-emitting element 41. Hence, the light-emitting element 41 does not influence its emission state owing to wear or scratches generated by friction against the screen 10.

The cap 46b adopts the material, characteristics, and structure as described in the first embodiment.

In the indicator 4 of FIG. 20, a space is ensured between the light-emitting element 41 and cap 46b covering it so as not to apply to the light-emitting element 41 any external force generated by directly pressing the cap 46b against the screen 10 in inputting coordinates. The cap 4b is detachably fitted in a holder 47b.

At B in FIG. 20, the projection of the cap 46b is substantially fitted in the recess of the holder 47b, and thus is stably fixed even when the cap 46b is directly pressed against the screen 10 to input coordinates. The cap 46b can be extracted in the direction of an arrow in FIG. 20 to be removed from the holder 47b of the indicator 4. This structure of the indicator 4 makes it possible to easily exchange the cap 46b with a new one when coordinates cannot be detected with high precision owing to scratches or the like. In this manner, the light-emitting element 41 can be prevented from being scratched, coordinates can always be detected at high precision in a good state by exchanging the cap 46b, and the service life of the apparatus can be prolonged. The mechanism for attaching/detaching the cap 46b is a simple structure of fitting it in the holder 47b in FIG. 20. So long as the mechanism exhibits high stability in inputting coordinates and high operability in exchange, the mechanism may take another structure such that the cap 46b is attached to the light-emitting element 41 via a transparent cushioning member.

Figure 21:
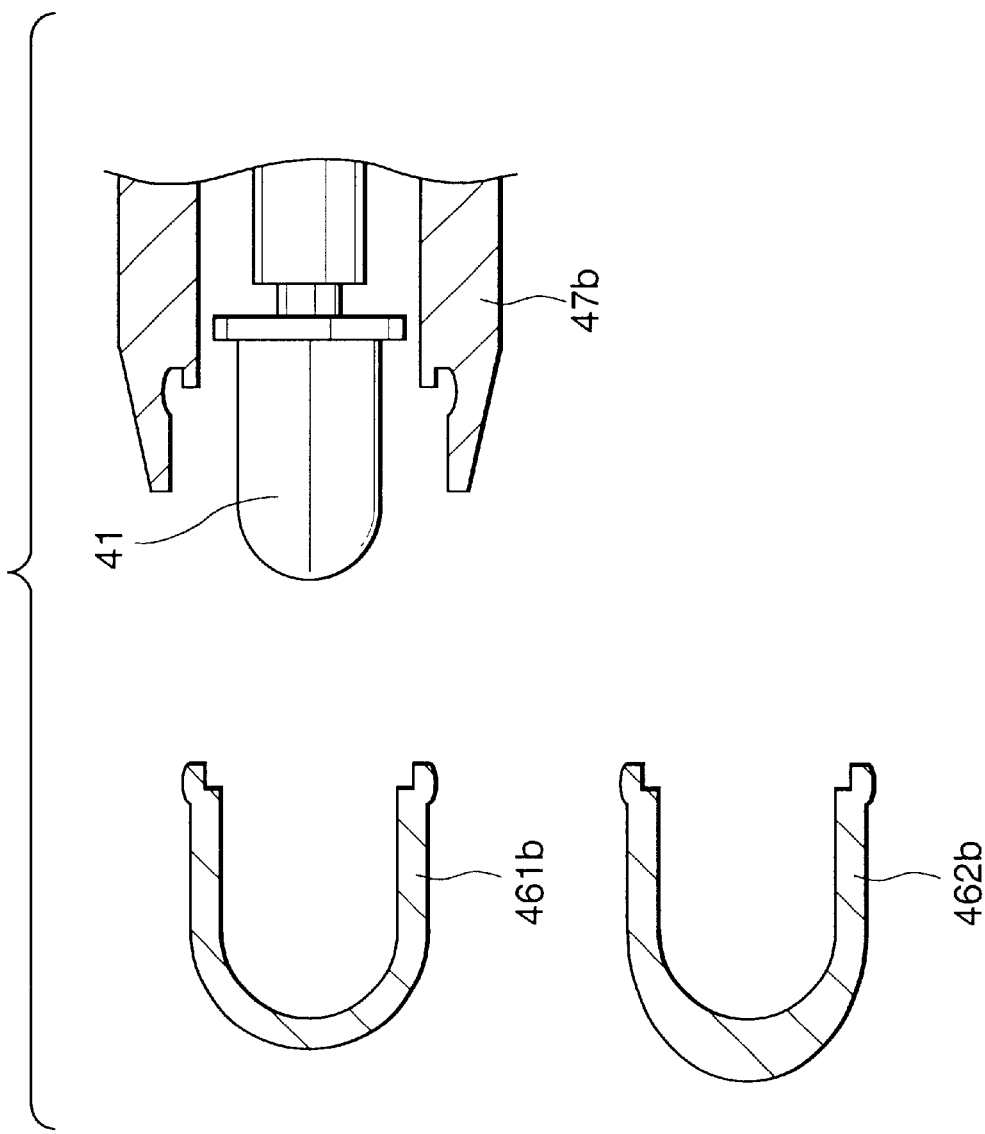
FIG. 21 is a sectional view showing the structure of the distal end of a modification of the coordinate input indicator according to the second embodiment of the present invention.

FIG. 21 is a view showing another detailed structure of the cap according to the second embodiment.

FIG. 21 shows a detachable transparent cap with lens characteristics. A cap 461b has optical concave lens characteristics, and a cap 462b has optical convex lens characteristics. As described above, a diffused light source suffices for direct input, so that the light-emitting element can be formed from a low-cost LED. The transparent sealing resin of the LED itself is given condenser lens characteristics. In this case, if light cannot be sufficiently diffused, and coordinates are input with the indicator 4 inclined with respect to the screen serving as the coordinate input surface, the light quantity may be insufficient for the coordinate detector In direct input, therefore, the cap 461b having concave lens characteristics is attached to obtain a sufficient light quantity even with the indicator 4 used at a wide angle with respect to the screen 10. This improves the operability. When the indicator 4 is used as a pointer, the cap 462b having convex lens characteristics is attached to form a light spot 5 sufficient in light quantity even if a light beam is emitted at a location apart from the screen 10.

It is desirable to optimally optically design the concave lens of the cap 461b in consideration of the use input angle and light quantity of the indicator 4, layout limitations such as the distance from the light-emitting element 41, and the directivity of the light-emitting element 41. This also applies to the convex lens of the cap 462b, and it is desirable to optimally optically design it so as to collimate light beams in consideration of the distance from the screen 10, light quantity, light-emitting element characteristics, and the like.

Figure 22:
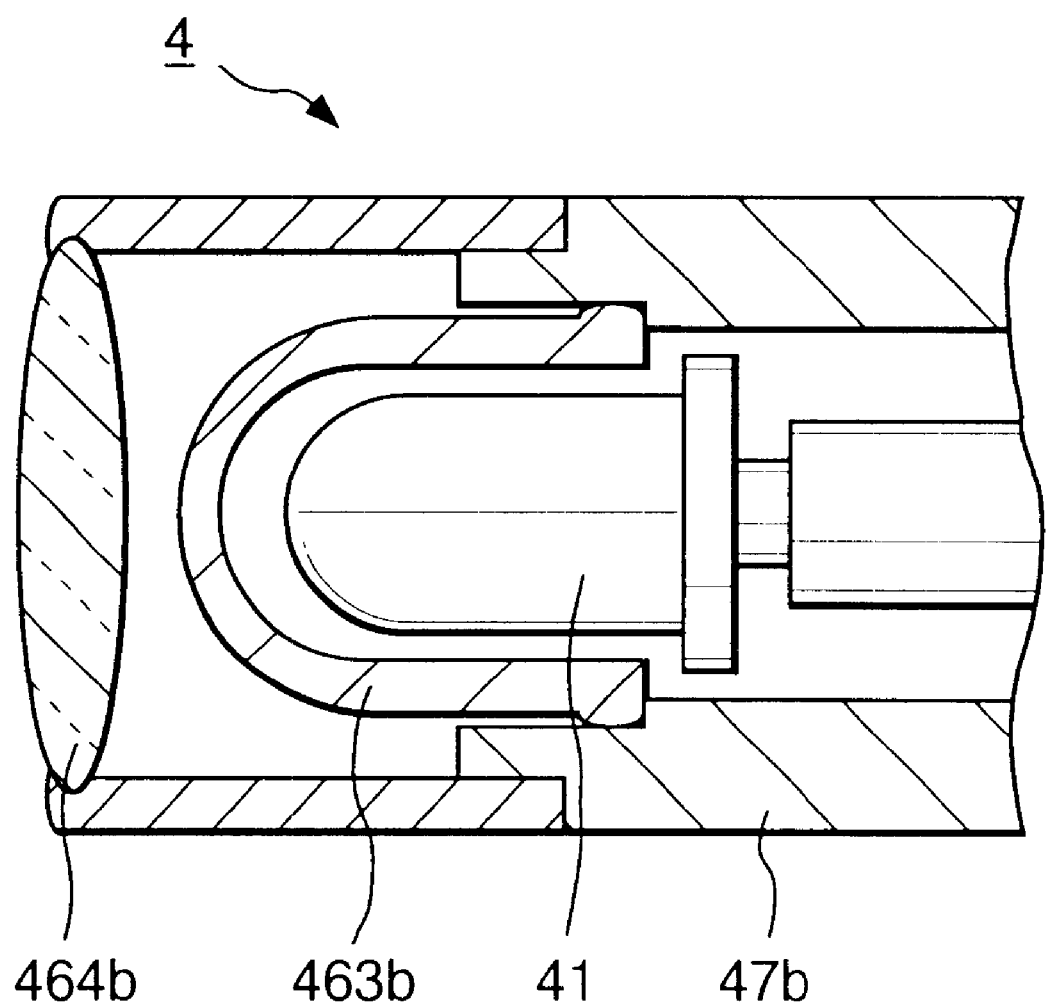
FIG. 22 is a sectional view showing the structure of the distal end of another modification of the coordinate input indicator according to the second embodiment of the present invention.

FIG. 22 is a view showing still another detailed structure of the cap according to the second embodiment.

FIG. 22 shows a cap attached integrally with the cap shown in FIG. 21 in consideration of convenience. Reference numeral 463b denotes a cap having optical concave lens characteristics; and 464b, a cap made up of a lens having optical convex lens characteristics and a cylindrical member fitted in the holder 47b of the indicator 4. When coordinates are input by directly bringing the indicator 4 into contact with the screen 10, the indicator 4 is used while detaching the cap 464b and keeping the cap 463b attached.

The concave lens characteristics of the cap 463b are the same as those of the cap 461b. When the indicator 4 is used as a pointer, the cap 463b is kept attached, and the cap 464b is attached to cover the cap 463b. The convex lens of the cap 464b is optically designed to reduce the radius of curvature so as to satisfactorily collimate light beams even through the concave lens of the cap 463b. Since the cap 464b does not directly contact the screen 10, the distal end of the cap 464b need not be shaped in consideration of the contact, as shown in FIG. 22. Further, the cylindrical member of the cap 464b except for the light projection portion need not be a transparent member.

In this structure, only the cap 464b is detached in the pen cap input mode, which reduces cumbersome operation. When coordinates cannot be detected with high precision owing to scratches or the like generated by the direct input use, the cap 463b can be easily exchanged with a new one. Although not shown, the cap shown in FIG. 21 or 22 may be equipped with a mechanism capable of moving each lens position forward/backward in order to adjust the light spot 5 formed on the screen 10 and the light quantity detected by the coordinate detector 1. Further, the cap may have a plurality of lenses by aberration design.

Figure 23:
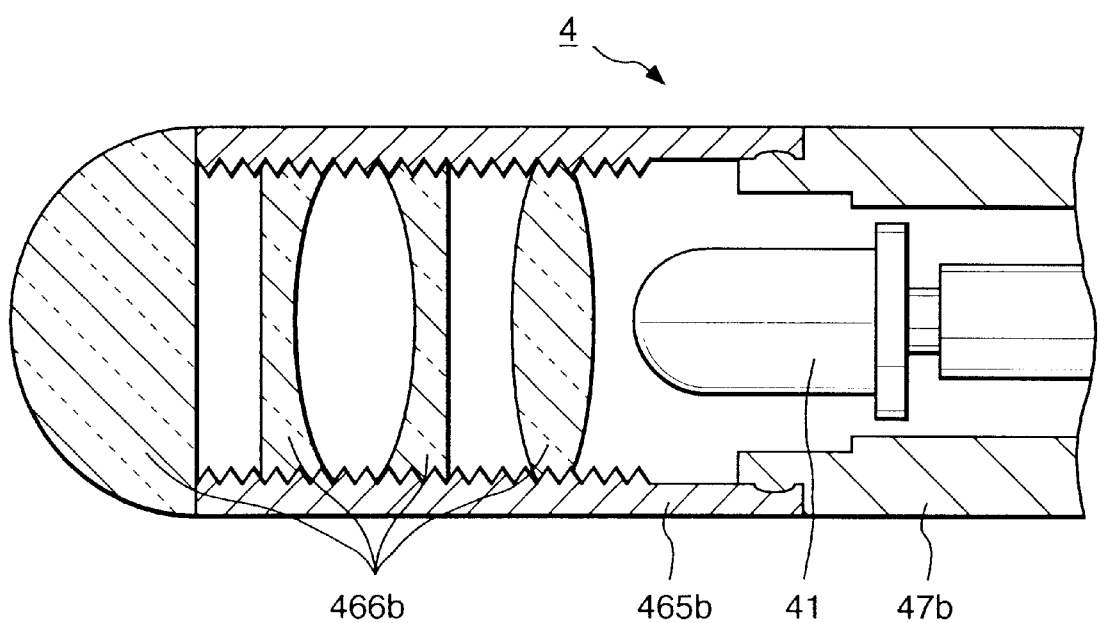
FIG. 23 is a sectional view showing the structure of the distal end of still another modification of the coordinate input indicator according to the second embodiment of the present invention.

To reduce cumbersome attachment/detachment in the pen cap input mode, a cap 465b having a simple zoom lens mechanism may be employed, as shown in FIG. 23. A change in positional relationship between zoom lenses need not be balanced over a wide range. The positional relationship is satisfactorily optically designed only in a telephoto arrangement for a pointer and a wide-angle arrangement for direct input. FIG. 23 shows a group of four zoom lenses, but the zoom lens group may be constituted by two zoom lenses or have another arrangement.

This structure makes it possible to form an optimal light spot corresponding to the input mode from the indicator 4 on the screen 10 serving as the coordinate input surface by adjusting the layout of zoom lenses without attaching/detaching the cap every time the input mode is switched. If the positional relationship between zoom lenses is designed to balance a change in positional relationship over a wide range, an optimal light spot corresponding to the distance from the screen 10 can be formed in the pointer mode. When coordinates cannot be detected with high precision owing to scratches or the like generated by the direct input use, the whole cap 465b or only its distal end can be easily exchanged.

As is apparent from the above description, according to the second embodiment, the indicator is provided with a detachable transparent member covering the light-emitting element. This transparent member can prevent any influence on the light-emitting element itself in inputting coordinates. When light is not satisfactorily emitted upon a decrease in emission amount or change in emission distribution owing to wear or the like, the transparent member can be changed with a new one. A high-resolving-power, high-performance coordinate input apparatus capable of emitting light always in a good state and maintaining a stable emission state for a long time can be provided.

Moreover, the transparent member can comprise a plurality of exchangeable transparent members having different optical irradiation characteristics. The indicator can have an optimal light emission/irradiation function.

Third Embodiment

The third embodiment concerns a modification of the cap 46 of the indicator 4 in the first embodiment.

<Detailed Description of Operation Switch 43B of Indicator 4>

The mechanical structure of an operation switch 43B serving as a penpoint switch attached to the distal end of an indicator 4 will be described with reference to FIGS. 24A and 24B.

As shown in FIGS. 24A and 24B, the operation switch 43B is constituted by a cap 46, sliding member 48 slidably attached to a holder 47 which holds the cap 46 and serves as the main body of the indicator 4, and tact (micro) switch 49 which operates interlockingly with the sliding member 48, i.e., the cap 46, and is electrically switched to switch driving control of a light-emitting element 41 by an emission controller 42.

The cap 46 is made of a transparent material and covers the light-emitting element 41. The cap 46 contacts a screen 10 when the distal end of the indicator 4 is directly brought into contact with the screen 10 to input coordinates. Since the light-emitting element 41 is covered with the cap 46, the light-emitting element 41 does not directly contact the screen 10. Since the cap 46 is attached to the sliding member 48 so as to be spaces apart from the light-emitting element 41, an external force generated by directly pressing the cap 46 against the screen 10 is not applied to the light-emitting element 41. Hence, the light-emitting element 41 does not influence its emission state owing to wear or scratches generated by friction against the screen 10.

The cap 46 must be made of a transparent material for transmitting light in order to transmit light from the light-emitting element 41 without attenuation and project the light on the screen. The cap 46 is made of a transparent resin material such as PMMA (polymethyl methacrylate), AS (styrene-acrylonitrile copolymer), PS (polystyrene), PC (polycarbonate), or epoxy resin. The cap 46 may be formed from another material and may be colored so long as the material is transparent.

The cap 46 is attached to the. distal end of the indicator 4 within a range where the cap 46 contacts the screen 10. The cap 46 has an almost hemispherical dome-like shape with a predetermined thickness so as to cope with operation of inputting coordinates with the inclined indicator 4. Note that the cap 46 suffices to exist in the minimum range so far as it contacts the screen 10.

The cap 46 is fitted in the sliding member 48, and the sliding member 48 is held by the holder 47 serving as the main body of the indicator 4 so as to be slidable axially along the indicator 4. The end face of the sliding member 48 opposite to the cap 46 is in contact with the tact switch 49. The tact switch 49 presses the sliding member 48 toward the distal end of the indicator 4 by the elastic force of a spring (not shown) incorporated in the tact switch 49. In FIGS. 24A and 24B, the sliding member 48 is formed from a single component for illustrative convenience, but may be formed from a plurality of components in order to stabilize sliding movement.

When coordinates are to be directly input on the screen 10 with this structure, the cap 46 is pressed against the screen 10. This pressure slides the sliding member 48 together with the cap 46 toward the tact switch 49 to press the tact switch 49, as shown in FIGS. 24A and 24B. When the pressure/sliding amount reaches a predetermined value, the tact switch 49 is electrically switched (turned on). The connected emission controller 42 switches the driving state of the light-emitting element 41 between an "emission" or "pen-down" state (see FIG. 3). Then, a pen-down control signal is output together with an emission signal.

When the cap 46 is separated apart from the screen 10, the tact switch 49 presses back the sliding member 48 and cap 46 by the force of the internal spring, and is turned off. The emission controller 42 stops outputting the emission signal and pen-down control signal in response to this.

Note that the operating pressure which operates the tact switch 49 upon pressing the cap 46 against the screen 10 is the return pressure of the internal spring of the tact switch 49. Although not shown, an external spring or the like may be added to adjust the operating pressure, and the sliding member 48 may be biased toward the distal end of the indicator 4.

The tact switch 49 may be of another type as long as the switch operates interlockingly with sliding movement of the cap 46 and sliding member 48, and can switch driving control of the light-emitting element 41 by the emission controller 42.

To more easily adjust the operating pressure of the tact switch 49, i.e., the operating pressure of the penpoint switch 43B, an adjustment member 50 may be arranged as a modification, as shown in FIGS. 25A and 25B. This adjustment member 50 is attached to the distal end of the holder 47 of the indicator 4 so as to contact the distal end face of the sliding member 48. The adjustment member 50 has a ring shape, and its inner surface is threaded (not shown) to allow screwing the adjustment member 50 into the thread groove formed in the outer surface (not shown) of the distal end of the holder 47. A user can fix the adjustment member 50 by rotating and moving it in two directions axially along the holder 47, as indicated by the double-headed arrow. By changing the fixed position of the adjustment member 50 axially along the holder 47, the stroke of the sliding member 48 which slides, as shown in FIGS. 25A to 25B, upon pressing the cap 46 against the screen 10 can be adjusted. This can adjust the operating stroke and operating pressure of the tact switch 49.

Note that an identical adjustment mechanism may be arranged on the rear side of the tact switch 49 to change the fixed position of the tact switch 49 in two directions axially along the holder 47, thereby adjusting the operating stroke and operating pressure.

In this way, the penpoint switch 43B is constituted by the cap 46 covering the light-emitting element 41 and the sliding/switch mechanism made up of the sliding member 48 and tact switch 49. Even when coordinates are input by pressing the distal end of the indicator 4 against the screen 10, the light-emitting element 41 does not contact the screen 10 or receive any external force. The transparent sealing resin of the light-emitting element 41 can be prevented from being worn and scratched. The light-emitting element 41 is therefore free from any decrease in irradiation light quantity and change in light quantity distribution owing to wear or scratches, and a decrease in coordinate detection precision can be prevented. Since the light-emitting element 41 is not worn or scratched, characters and the like can be naturally input.

The cap 46 may be fixed to the sliding member 48 or detachable from the sliding member 48. The detachable cap 46 can be exchanged if it is worn or scratched. For the detachable cap 46, the sliding member 48 is arranged sufficiently deep from the distal end of the holder 47 so as to prevent an operator from erroneously pressing the sliding member 48 with a finger or the like and emitting light from the light-emitting element 41 upon removing the cap 46. A gap A in FIG. 24A between the light-emitting element 41 and holder 47 is desirably set slightly larger than the thickness of the cap 46 so as to prevent the operator from touching the sliding member 48 with a finger or the like.

Figure 26:
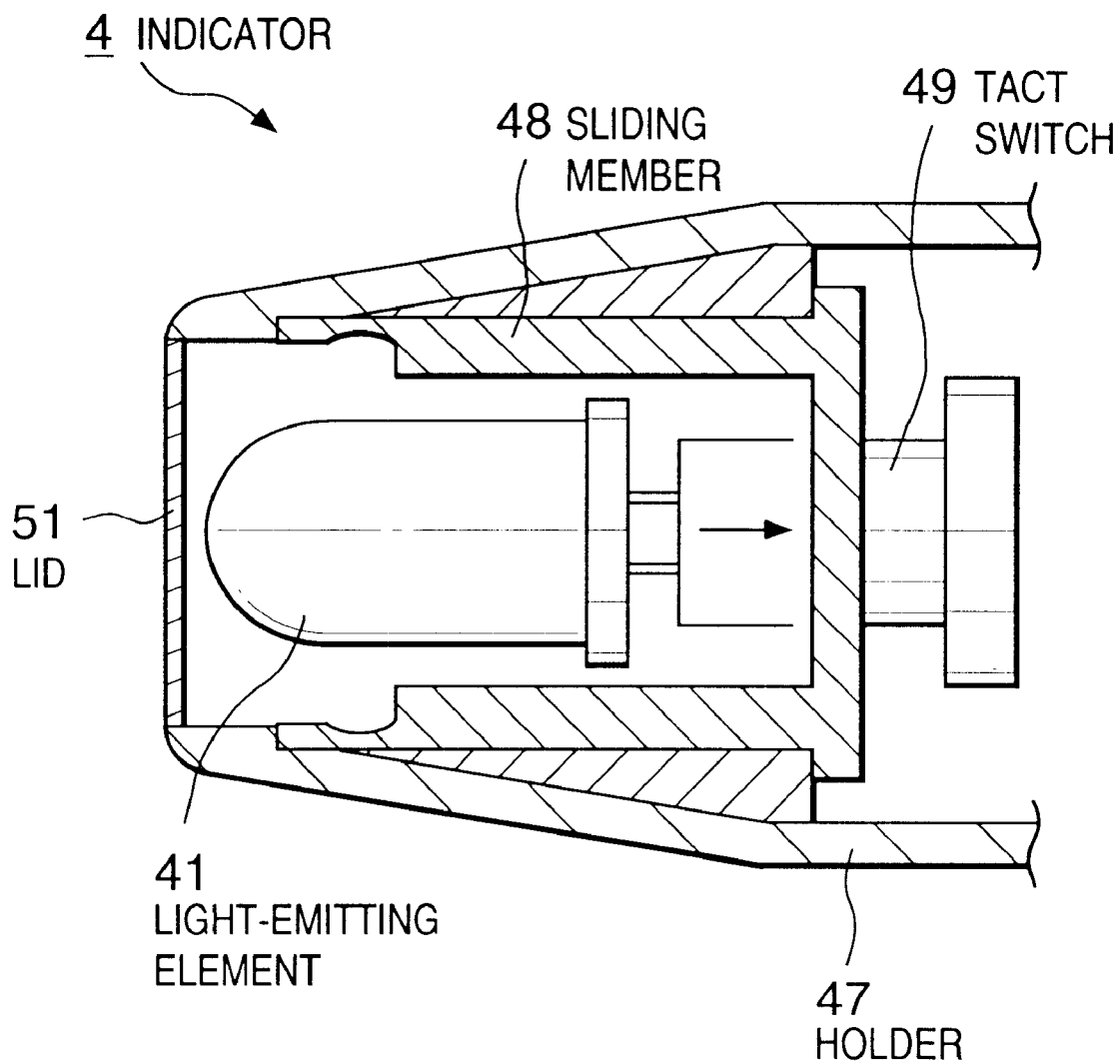
FIG. 26 is a sectional view showing the structure of the distal end of another modification of the coordinate input indicator according to the third embodiment of the present invention.

FIG. 26 shows another effective structure for preventing the operator from touching the sliding member 48 with a finger or the like upon removing the cap 46. As shown in FIG. 26, when the cap 46 is removed, a collapsible barrel type light-emitting element 41 is retracted deep in the holder 47. A lid 51 covering the opening at the distal end of the holder 47 is attached.

As is apparent from the above description, according to the third embodiment, the coordinate input indicator of the optical coordinate input apparatus is equipped with the cap made of a transparent material which covers the light-emitting element for emitting light in order to form a light spot. This cap can prevent the light-emitting element from being worn and scratched owing to friction against the coordinate input surface when coordinates are input by bringing the distal end of the coordinate input indicator into contact with the coordinate input surface. The durability of the light-emitting element can be improved, the emission state of the light-emitting element can always be kept stable, and coordinates can be accurately input. Since driving control of the light-emitting element is switched by pressing/separating the cap against/from the coordinate input surface, driving control of the light-emitting element need not be additionally switched, resulting in high operability.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input indicator which forms a light spot on a coordinate input surface of an optical coordinate input apparatus to input coordinates, and has at a distal end a light-emitting element for forming a light spot, comprising:

a cap which is made of a transparent material and covers the light-emitting element at the distal end of said indicator, wherein said cap contacts the coordinate input surface when the distal end of said indicator is brought into contact with the coordinate input surface to input coordinates, and wherein said cap is attached to the light-emitting element via a transparent elastic cushioning member.

2. A coordinate input indicator which forms a light spot on a coordinate input surface of an optical coordinate input apparatus to input coordinates, and has at a distal end a light-emitting element for forming a light spot, comprising:

a cap which is made of a transparent material and covers the light-emitting element at the distal end of said indicator, wherein said cap contacts the coordinate input surface when the distal end of said indicator is brought into contact with the coordinate input surface to input coordinates, and wherein the transparent material forming said cap includes an agent for reducing a coefficient of friction on a surface of said cap.

3. The indicator according to claim 2, wherein an outer surface layer of said cap is an added layer in which a lubricant for reducing the coefficient of friction is added, or a cured coating layer which increases surface hardness, and an inner layer of the light-emitting element is a non-added layer in which no lubricant is added, or an uncured layer.

4. A coordinate input indicator which forms a light spot on a coordinate input surface of an optical coordinate input apparatus to input coordinates, and has at a distal end a light-emitting element for forming a light spot, comprising:

a cap which is made of a transparent material and covers the light-emitting element at the distal end of said indicator, wherein said cap contacts the coordinate input surface when the distal end of said indicator is brought into contact with the coordinate input surface to input coordinates, and wherein grained slipping members mainly containing a lubricant for reducing the coefficient of friction of said cap are interspersed on at least a surface of said cap.

5. A coordinate input indicator which forms a light spot on a coordinate input surface of an optical coordinate input apparatus to input coordinates, and has at a distal end a light-emitting element for forming a light spot, comprising:

a cap which is made of a transparent material and covers the light-emitting element at the distal end of said indicator, wherein said cap contacts the coordinate input surface when the distal end of said indicator is brought into contact with the coordinate input surface to input coordinates, and wherein linear slipping members mainly containing a lubricant for reducing the coefficient of friction of said cap are formed on a surface of said cap.

6. A coordinate input indicator for irradiating a predetermined position on a coordinate input screen with light to form a light spot, and inputting coordinates corresponding to the light spot, comprising:

light-emitting means for emitting light; and a transparent member which covers said light-emitting means and is detachable from said coordinate input indicator, wherein said transparent member comprises a first transparent member having a concave lens for diffusing light toward the coordinate input screen, and a second transparent member having a convex lens characteristic for condensing light on the coordinate input screen, said first transparent member has a rounded shape, said second transparent member has a cylindrical shape, and said second transparent member is attached to said first transparent member attached to said light-emitting means.

7. The indicator according to claim 6, wherein said transparent member is made of at least one transparent resin material selected from the group consisting of PMMA (polymethyl methacrylate), AS (styrene-acrylonitrile copolymer), PS (polystyrene), PC (polycarbonate), and epoxy resin.

8. The indicator according to claim 6, wherein said transparent member has a rounded shape with a predetermined thickness.

9. A coordinate input indicator for irradiating a predetermined position on a coordinate input screen with light to form a light spot, and inputting coordinates corresponding to the light spot, comprising:

light-emitting means for emitting light; and a transparent member which covers said light-emitting means and is detachable from said coordinate input indicator, wherein said transparent member comprises at least a first transparent member having a concave lens for diffusing light toward the coordinate input screen, and a second transparent member having a convex lens characteristics for condensing light on the coordinate input screen, and said first and second transparent members constitute a zoom lens mechanism.

10. The indicator according to claim 9, wherein said transparent member is made of at least one transparent resin material selected from the group consisting of PMMA (polymethyl methacrylate), AS (styrene-acrylonitrile copolymer), PS (polystyrene), PC (polycarbonate), and epoxy resin.

11. The indicator according to claim 9, wherein said transparent member has a rounded shape with a predetermined thickness.

12. A coordinate input indicator of an optical coordinate input apparatus for detecting and inputting coordinates of an irradiated position of a light spot formed on a coordinate input surface, said indicator being used to indicate an arbitrary position on the coordinate input surface, form the light spot, and input coordinates, comprising:

a light-emitting element which is attached to a distal end of said coordinate input indicator to emit light in order to form the light spot;

a cap which is made of a transparent material, covers said light-emitting element, and is movably attached;

control means for controlling driving of said light-emitting element;

switching means which operates interlockingly with said cap and switches driving control of said light-emitting element by said control means, wherein said cap is pressed/separated against/from the coordinate input surface to operate said switching means, and driving control of said light-emitting element by said control means is switched; and means for adjusting an operating stroke by which said switching means operates interlockingly with said cap.

13. A coordinate input indicator of an optical coordinate input apparatus for detecting and inputting coordinates of an irradiated position of a light spot formed on a coordinate input surface, said indicator being used to indicate an arbitrary position on the coordinate input surface, form the light spot, and input coordinates, comprising:

a light-emitting element which is attached to a distal end of said coordinate input indicator to emit light in order to form the light spot;

a cap which is made of a transparent material, covers said light-emitting element, and is movably attached;

control means for controlling driving of said light-emitting element;

switching means which operates interlockingly with said cap and switches driving control of said light-emitting element by said control means, wherein said cap is pressed/separated against/from the coordinate input surface to operate said switching means, and driving control of said light-emitting element by said control means is switched; and means for adjusting an operating pressure which operates said switch means interlockingly with said cap.

* * * * *

UNITED STATES PATENT AND TRADEMARK OFFICE
CERTIFICATE OF CORRECTION

PATENT NO. : 6,664,954 B1
DATED : December 16, 2003
INVENTOR(S) : Yuichiro Yoshimura et al.

It is certified that error appears in the above-identified patent and that said Letters Patent is hereby corrected as shown below:

Drawings,
Sheet 19, FIG. 18, "FORONE-CYCLE" should read -- FOR ONE CYCLE --.

Column 3,
Line 66, "zoom" should read -- a zoom --.

Column 4,
Line 4, "resent" should read -- present --.

Column 8,
Line 64, "must" should read -- 10 must --.

Column 13,
Line 65, "the." should read -- the --.

Column 20,
Line 42, "detector" should read -- detector 1. --.

Column 22,
Line 40, "the." should read -- the --.

Signed and Sealed this

Thirteenth Day of July, 2004

JON W. DUDAS
*Acting Director of the United States Patent and Trademark Office*